United States Patent
Miller et al.

(10) Patent No.: US 10,918,976 B2
(45) Date of Patent: *Feb. 16, 2021

(54) SUPPORT AND DRAINAGE MATERIAL, FILTER, AND METHOD OF USE

(71) Applicant: Pall Corporation, Port Washington, NY (US)

(72) Inventors: John P. Miller, Cortland, NY (US); Martin Zeiler, Schwaebisch Gmuend (DE)

(73) Assignee: Pall Corporation, Port Washington, NY (US)

(*) Notice: Subject to any disclaimer, the term of this patent is extended or adjusted under 35 U.S.C. 154(b) by 178 days.

This patent is subject to a terminal disclaimer.

(21) Appl. No.: 16/169,588

(22) Filed: Oct. 24, 2018

(65) Prior Publication Data

US 2020/0129889 A1   Apr. 30, 2020

(51) Int. Cl.
| | |
|---|---|
| *B01D 29/07* | (2006.01) |
| *B01D 39/14* | (2006.01) |
| *B01D 46/52* | (2006.01) |
| *B01D 39/08* | (2006.01) |
| *B01D 46/00* | (2006.01) |
| *B01D 39/16* | (2006.01) |
| *E02D 31/10* | (2006.01) |
| *B01D 29/01* | (2006.01) |

(52) U.S. Cl.
CPC .......... *B01D 29/07* (2013.01); *B01D 39/08* (2013.01); *B01D 39/14* (2013.01); *B01D 46/0031* (2013.01); *B01D 46/521* (2013.01); *B01D 39/083* (2013.01); *B01D 39/16* (2013.01); *B01D 46/52* (2013.01); *E02D 31/10* (2013.01)

(58) Field of Classification Search
None
See application file for complete search history.

(56) References Cited

U.S. PATENT DOCUMENTS

| | | | |
|---|---|---|---|
| 3,198,336 A * | 8/1965 | Hyslop | B01D 29/21 210/457 |
| 5,263,792 A | 11/1993 | Davis et al. | |
| 5,543,047 A | 8/1996 | Stoyell et al. | |
| 5,552,048 A | 9/1996 | Miller et al. | |
| 6,599,638 B1 * | 7/2003 | Krishnan | B01D 39/1623 428/474.4 |
| 6,786,013 B2 | 9/2004 | Coulton | |
| 7,625,418 B1 | 12/2009 | Choi | |

(Continued)

FOREIGN PATENT DOCUMENTS

| | | |
|---|---|---|
| EP | 0 867 216 A1 | 9/1998 |
| JP | 2004-519319 A | 7/2004 |

(Continued)

OTHER PUBLICATIONS

European Patent Office, Extended European Search Report in counterpart European Application No. 19201957.8, dated Mar. 6, 2020.

(Continued)

*Primary Examiner* — Clare M Perrin
(74) *Attorney, Agent, or Firm* — Leydig, Volt & Mayer, Ltd.

(57) ABSTRACT

Support and drainage materials, filter including the materials, and methods of use are disclosed.

9 Claims, 13 Drawing Sheets

(56) References Cited

U.S. PATENT DOCUMENTS

Figure 1A:
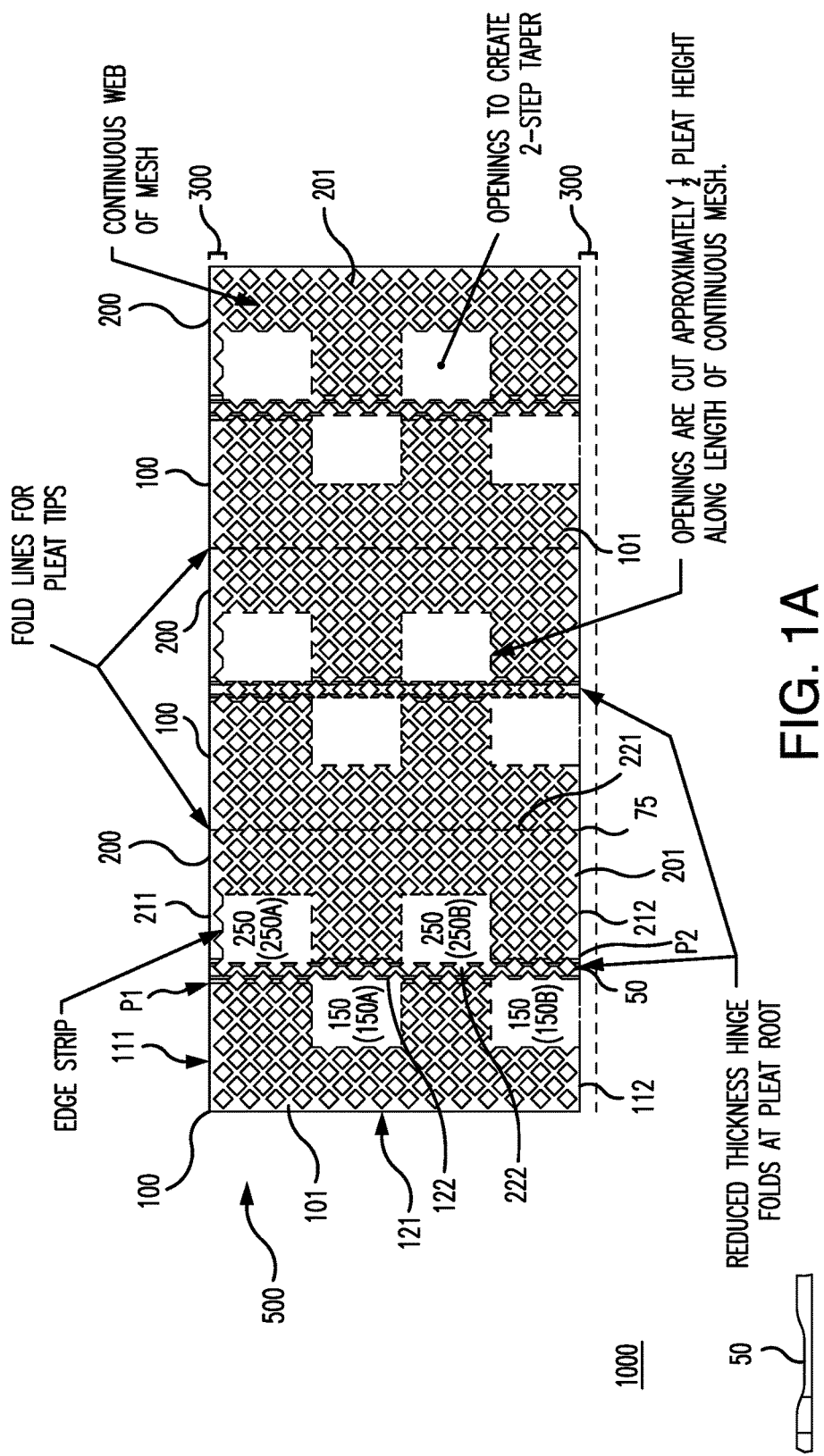

| | | |
|---|---|---|
| 10,286,343 B2 | 5/2019 | Paluszewski et al. |
| 2002/0027102 A1 | 3/2002 | Robillard |
| 2004/0131423 A1 | 7/2004 | Ianniello et al. |
| 2015/0007539 A1 | 1/2015 | Mbadinga-Mouanda et al. |

FOREIGN PATENT DOCUMENTS

| | | | |
|---|---|---|---|
| JP | 2018-069228 A | 5/2018 | |
| WO | WO 1993/017777 A1 | 9/1993 | |
| WO | WO-2017031168 A1 * | 2/2017 | ......... B01D 46/0001 |

OTHER PUBLICATIONS

Japanese Patent Office, Office Action in Counterpart Japanese Patent Application No. 2019-167313, dated Oct. 27, 2020.

\* cited by examiner

SIDE

DETAIL E

DETAIL F

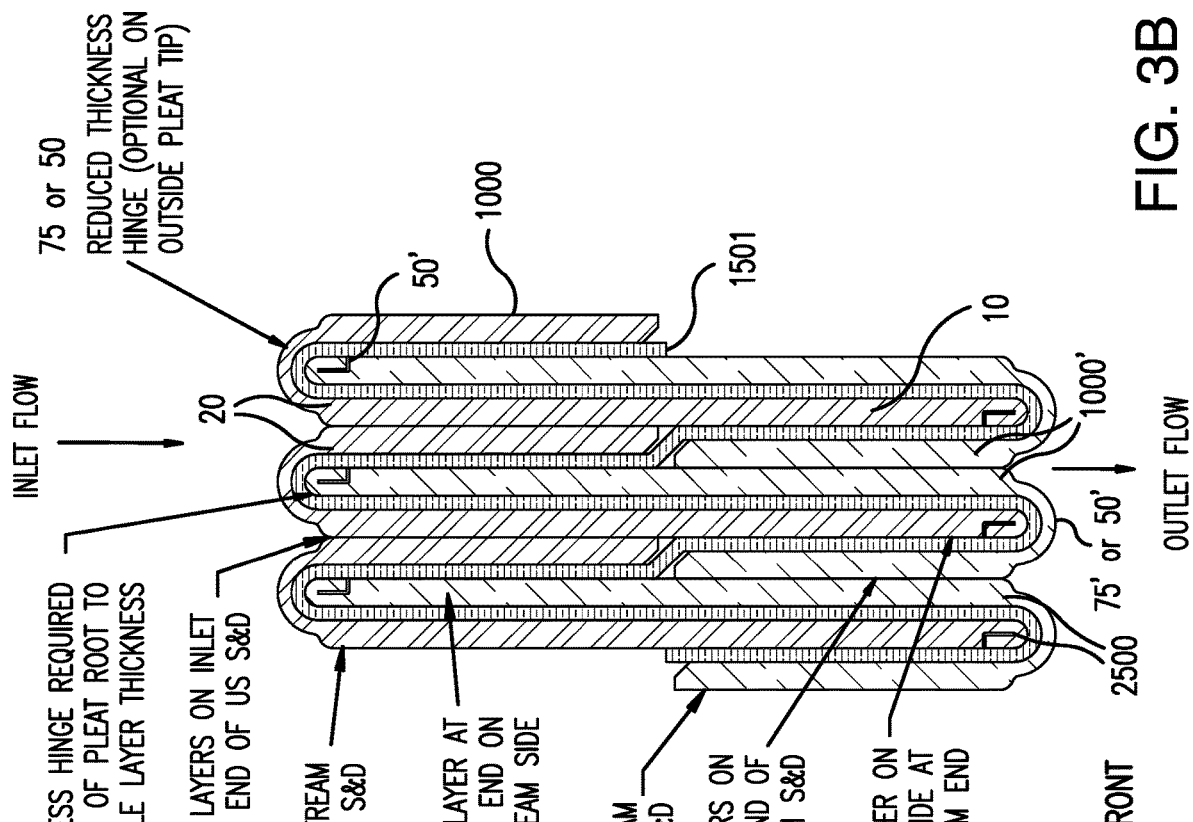
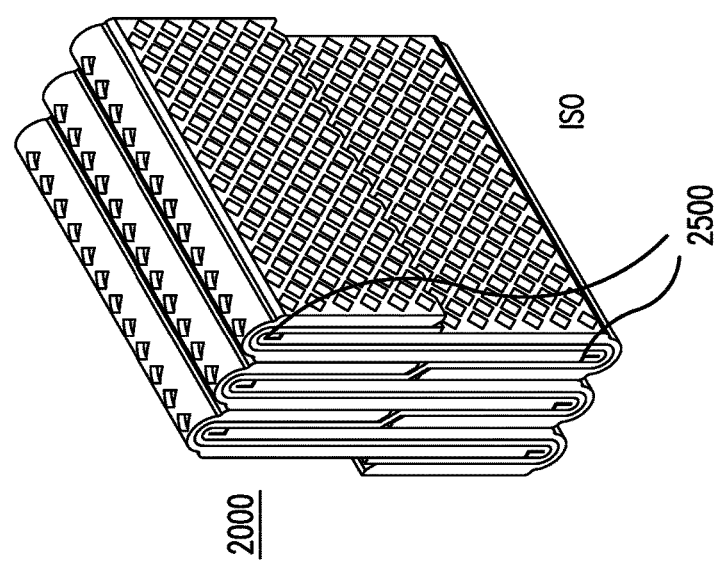
FIG. 3B
FIG. 3A

SIDE

FRONT

Constant Thickness  Tapered

SUPPORT AND DRAINAGE MATERIAL, FILTER, AND METHOD OF USE

BACKGROUND OF THE INVENTION

Support and drainage elements such as meshes (also called screens or netting) are utilized in a number of filtration applications, wherein the support and drainage ("S&D") elements are arranged upstream and/or downstream of porous filter media. The support and drainage elements have much larger openings than the pores of the filter media, and provide support to the filter media and/or provide good drainage for the filter media.

However, there is a need for improved support and drainage elements.

The present invention provides for ameliorating at least some of the disadvantages of the prior art. These and other advantages of the present invention will be apparent from the description as set forth below.

BRIEF SUMMARY OF THE INVENTION

An embodiment of the invention provides a support and drainage material comprising a foldable element allowing fluid flow through, the element comprising at least one first section comprising a mesh or a non-woven fabric having a first end and a second end, a first side and a second side, a first major surface and a second major surface, and a first section bulk between the first major surface and the second major surface, the first section bulk having a thickness extending from the first end to a portion of the second end; wherein the at least one first section further comprises at least one first section aperture extending a length of about 25% to about 75% a distance between the first end and the second end, and extending a length of about 2% to about 100% a distance between the first side and the second side; and/or at least one second section comprising a mesh or a non-woven fabric having a first end and a second end, a first side and a second side, a first major surface and a second major surface, and a second section bulk between the first major surface and the second major surface, the second section bulk having a thickness extending from the first end to a portion of the second end; wherein the at least one second section further comprises at least one second section aperture extending a length of about 25% to about 75% a distance between the first end and the second end, and extending a length of about 2% to about 100% a distance between the first side and the second side; wherein, when the foldable element is folded, a part of the first section bulk thickness fits in the at least one aperture of the at least one second section, and/or a part of the second section bulk thickness fits in the at least one aperture of the at least one first section.

In an embodiment, the support and drainage material further comprises an additional first section and an additional second section, wherein the additional first section is foldably connected to the second section, and the additional second section is foldably connected to the additional first section; wherein, when the foldable element is folded, a part of the additional first section bulk thickness fits in the at least one aperture of the additional second section, and a part of the additional second section bulk thickness fits in the at least one aperture of the additional first section.

In another embodiment, a support and drainage material system is provided, comprising a first support and drainage material allowing fluid flow through and a second separate support and drainage material allowing fluid flow through; (a) the first support and drainage material comprising a first foldable element allowing fluid flow through, the first foldable element comprising at least one first section comprising a mesh or a non-woven fabric having a first end and a second end, a first side and a second side, a first major surface and a second major surface, and a first section bulk between the first major surface and the second major surface, the first section bulk having a thickness extending from the first end to a portion of the second end; wherein the at least one first section further comprises at least one first section aperture extending a length of about 25% to about 75% a distance between the first end and the second end, and extending a length of about 2% to about 100% a distance between the first side and the second side; and/or at least one second section comprising a mesh or a non-woven fabric having a first end and a second end, a first side and a second side, a first major surface and a second major surface, and a second section bulk between the first major surface and the second major surface, the second section bulk having a thickness extending from the first end to a portion of the second end; wherein the at least one second section further comprises at least one second section aperture extending a length of about 25% to about 75% a distance between the first end and the second end, and extending a length of about 2% to about 100% a distance between the first side and the second side; wherein, when the first foldable element is folded, a part of the first section bulk thickness fits in the at least one aperture of the at least one second section, and/or a part of the second section bulk thickness fits in the at least one aperture of the at least one first section; and, (b) the second support and drainage material comprising a second foldable element allowing fluid flow through, the second foldable element comprising at least one first section comprising a mesh or a non-woven fabric having a first end and a second end, a first side and a second side, a first major surface and a second major surface, and a first section bulk between the first major surface and the second major surface, the first section bulk having a thickness extending from the first end to a portion of the second end; wherein the at least one first section further comprises at least one first section aperture extending a length of about 25% to about 75% a distance between the first end and the second end, and extending a length of about 2% to about 100% a distance between the first side and the second side; and/or at least one second section comprising a mesh or a non-woven fabric having a first end and a second end, a first side and a second side, a first major surface and a second major surface, and a second section bulk between the first major surface and the second major surface, the second section bulk having a thickness extending from the first end to a portion of the second end; wherein the at least one second section further comprises at least one second section aperture extending a length of about 25% to about 75% a distance between the first end and the second end, and extending a length of about 2% to about 100% a distance between the first side and the second side; wherein, when the second foldable element is folded, a part of the first section bulk thickness fits in the at least one aperture of the at least one second section, and/or a part of the second section bulk thickness fits in the at least one aperture of the at least one first section.

A support and drainage material according to another embodiment of the invention comprises a foldable element allowing fluid flow through, the element comprising (A) a first foldable layer comprising (i) at least one first section comprising a mesh or a non-woven fabric having a first end and a second end, a first side and a second side, a first major surface and a second major surface, and a first section bulk between the first major surface and the second major surface, the first section bulk having a thickness extending from the first end toward the second end without reaching the second end; wherein the at least one first section further comprises at least one first section aperture extending a length of about 15% to about 35% a distance between the first end and the second end, and extending a length of about 2% to about 100% a distance between the first side and the second side; and, (ii) at least one second section comprising a mesh or a non-woven fabric having a first end and a second end, a first side and a second side, a first major surface and a second major surface, and a second section bulk between the first major surface and the second major surface, the second section bulk having a thickness extending from the second end toward the first end without reaching the first end; wherein the at least one second section further comprises at least one second section aperture extending a length of about 40% to about 60% a distance between the second end and the first end, and extending a length of about 2% to about 100% a distance between the first side and the second side; and, (B) a second foldable layer comprising (iii) at least one first section comprising a mesh or a non-woven fabric having a first end and a second end, a first side and a second side, a first major surface and a second major surface, and a first section bulk between the first major surface and the second major surface, the first section bulk having a thickness extending from the second end to the first end; and, (iv) at least one second section comprising a mesh or a non-woven fabric having a first end and a second end, a first side and a second side, a first major surface and a second major surface, and a second section bulk between the first major surface and the second major surface; the second section bulk having a thickness extending from the second end toward the first end without reaching the first end; wherein the at least one second section further comprises at least one second section aperture extending a length of about 65% to about 85% a distance between the first end and the second end, and extending a length of about 2% to about 100% a distance between the first side and the second side; wherein the first foldable layer (A) is placed on top of the second foldable layer (B); and wherein, when the foldable element is folded, a part of the first section bulk thickness and/or a part of the second bulk thickness of the first foldable layer (A) fits in some of the at least one apertures of the at least one second section of the second foldable layer (B); and/or a part of the first section bulk thickness of the second foldable layer (B) fits in some of the at least one apertures of the at least one first section and/or the at least one apertures of the at least one second section of the first foldable layer (A).

Another embodiment of a support and drainage material system comprises a first support and drainage material allowing fluid flow through and a second separate support and drainage material allowing fluid flow through; (a) the first support and drainage material comprising a first foldable element allowing fluid flow through, the first foldable element comprising (A) a first foldable layer comprising (i) at least one first section comprising a mesh or a non-woven fabric having a first end and a second end, a first side and a second side, a first major surface and a second major surface, and a first section bulk between the first major surface and the second major surface, the first section bulk having a thickness extending from the first end toward the second end without reaching the second end; wherein the at least one first section further comprises at least one first section aperture extending a length of about 15% to about 35% a distance between the first end and the second end, and extending a length of about 2% to about 100% a distance between the first side and the second side; and, (ii) at least one second section comprising a mesh or a non-woven fabric having a first end and a second end, a first side and a second side, a first major surface and a second major surface, and a second section bulk between the first major surface and the second major surface, the second section bulk having a thickness extending from the second end toward the first end without reaching the first end; wherein the at least one second section further comprises at least one second section aperture extending a length of about 40% to about 60% a distance between the second end and the first end, and extending a length of about 2% to about 100% a distance between the first side and the second side; and, (B) a second foldable layer comprising (iii) at least one first section comprising a mesh or a non-woven fabric having a first end and a second end, a first side and a second side, a first major surface and a second major surface, and a first section bulk between the first major surface and the second major surface, the first section bulk having a thickness extending from the second end to the first end; and, (iv) at least one second section comprising a mesh or a non-woven fabric having a first end and a second end, a first side and a second side, a first major surface and a second major surface, and a second section bulk between the first major surface and the second major surface; the second section bulk having a thickness extending from the second end toward the first end without reaching the first end; wherein the at least one second section further comprises at least one second section aperture extending a length of about 65% to about 85% a distance between the first end and the second end, and extending a length of about 2% to about 100% a distance between the first side and the second side; wherein the first foldable layer (A) is placed on top of the second foldable layer (B); and wherein, when the foldable element is folded, a part of the first section bulk thickness and/or a part of the second bulk thickness of the first foldable layer (A) fits in some of the at least one apertures of the at least one second section of the second foldable layer (B); and/or a part of the first section bulk thickness of the second foldable layer (B) fits in some of the at least one apertures of the at least one first section and/or the at least one apertures of the at least one second section of the first foldable layer (A); and, (b) the second support and drainage material comprising a second foldable element allowing fluid flow through, the second foldable element comprising (C) a first foldable layer comprising (i) at least one first section comprising a mesh or a non-woven fabric having a first end and a second end, a first side and a second side, a first major surface and a second major surface, and a first section bulk between the first major surface and the second major surface, the first section bulk having a thickness extending from the first end toward the second end without reaching the second end; wherein the at least one first section further comprises at least one first section aperture extending a length of about 15% to about 35% a distance between the first end and the second end, and extending a length of about 2% to about 100% a distance between the first side and the second side; and, (ii) at least one second section comprising a mesh or a non-woven fabric having a first end and a second end, a first side and a second side, a first major surface and a second major surface, and a second section bulk between the first major surface and the second major surface, the second section bulk having a thickness extending from the second end toward the first end without reaching the first end; wherein the at least one second section further comprises at least one second section aperture extending a length of about 40% to about 60% a distance between the second end and the first end, and extending a length of about 2% to about 100% a distance between the first side and the second side; and, (D) a second foldable layer comprising (iii) at least one first section comprising a mesh or a non-woven fabric having a first end and a second end, a first side and a second side, a first major surface and a second major surface, and a first section bulk between the first major surface and the second major surface, the first section bulk having a thickness extending from the second end to the first end; and, (iv) at least one second section comprising a mesh or a non-woven fabric having a first end and a second end, a first side and a second side, a first major surface and a second major surface, and a second section bulk between the first major surface and the second major surface; the second section bulk having a thickness extending from the second end toward the first end without reaching the first end; wherein the at least one second section further comprises at least one second section aperture extending a length of about 65% to about 85% a distance between the first end and the second end, and extending a length of about 2% to about 100% a distance between the first side and the second side; wherein the first foldable layer (C) is placed on top of the second foldable layer (D); and wherein, when the foldable element is folded, a part of the first section bulk thickness and/or a part of the second bulk thickness of the first foldable layer (C) fits in some of the at least one apertures of the at least one second section of the second foldable layer (D); and/or a part of the first section bulk thickness of the second foldable layer (D) fits in some of the at least one apertures of the at least one first section and/or the at least one apertures of the at least one second section of the first foldable layer (C).

A filter arrangement according to an embodiment of the invention comprises a pleated porous filter having a plurality of pleats and having an upstream surface and a downstream surface; and, an embodiment of the support and drainage material, arranged to contact the upstream surface of the pleated porous filter, or to contact the downstream surface of the pleated porous filter.

In another embodiment, a filter system is provided comprising a pleated porous filter having a plurality of pleats and having an upstream surface and a downstream surface; and, an embodiment of the support and drainage material system, wherein the pleated porous filter is arranged between the first support and drainage material and the second support and drainage material.

A method of filtering fluid according to an embodiment of the invention comprises passing a fluid through an embodiment of the filter system, including passing fluid through the first support and drainage material, the upstream surface of the pleated porous filter, the downstream surface of the pleated porous filter, and the second support and drainage material.

BRIEF DESCRIPTION OF THE SEVERAL VIEWS OF THE DRAWING(S)

Figure 1B:
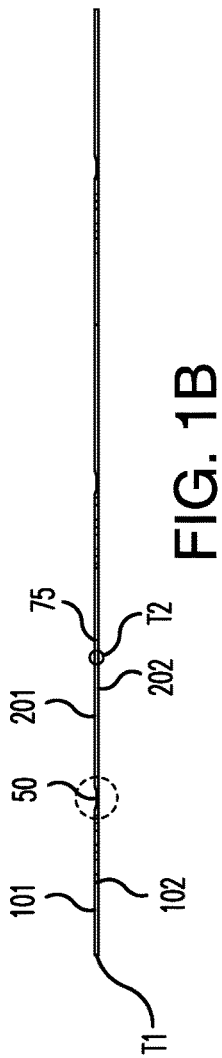
Figure 1C:

FIGS. 1A-1C show an unfolded support and drainage material according to an embodiment of the invention, wherein the material comprises mesh(es) or non-woven fabric(s), showing a plurality of first and second sections, some of the sections connected by reduced-thickness hinges, also showing folding locations (where the pliable S&D materials will fold over outside of the pleat tip or pleat root, e.g., a "foldable connection" such as a non-reduced thickness hinge), each section comprising apertures. FIG. 1A shows a top view, FIG. 1B shows a side view, and FIG. 1C shows a detail of the FIG. 1B view, showing a reduced-thickness hinge.

Figure 2A:
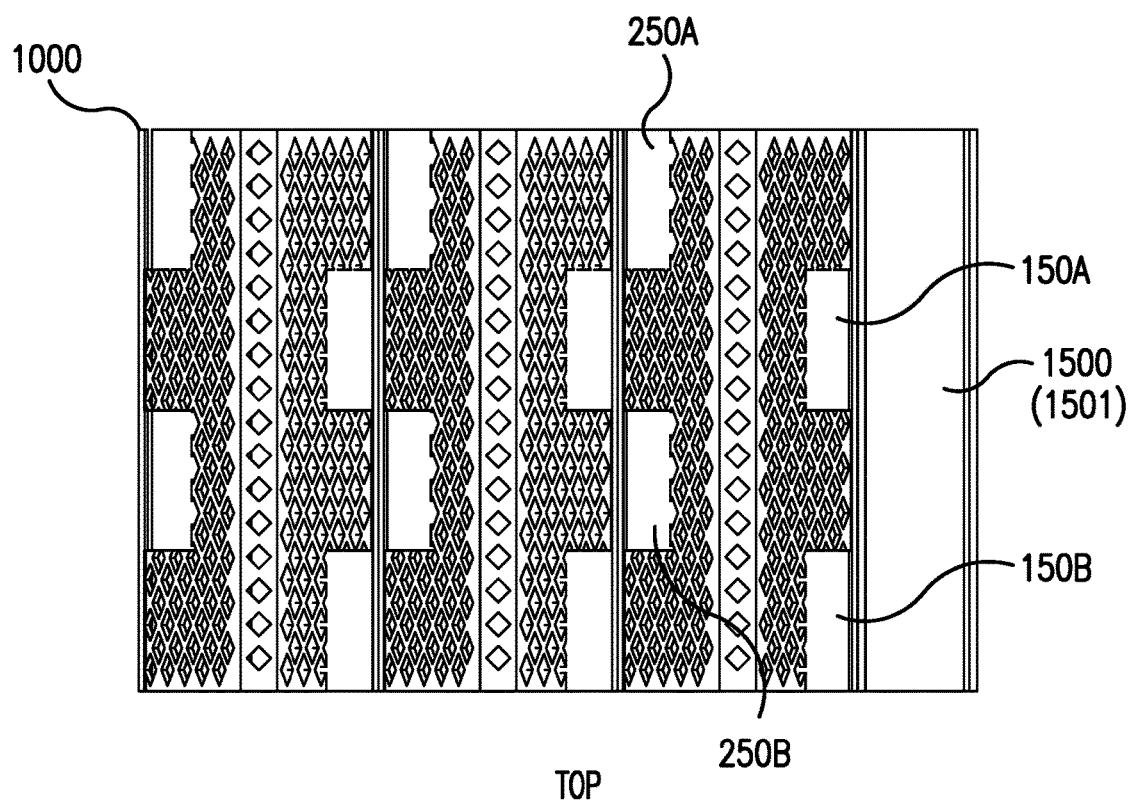
Figure 2B:
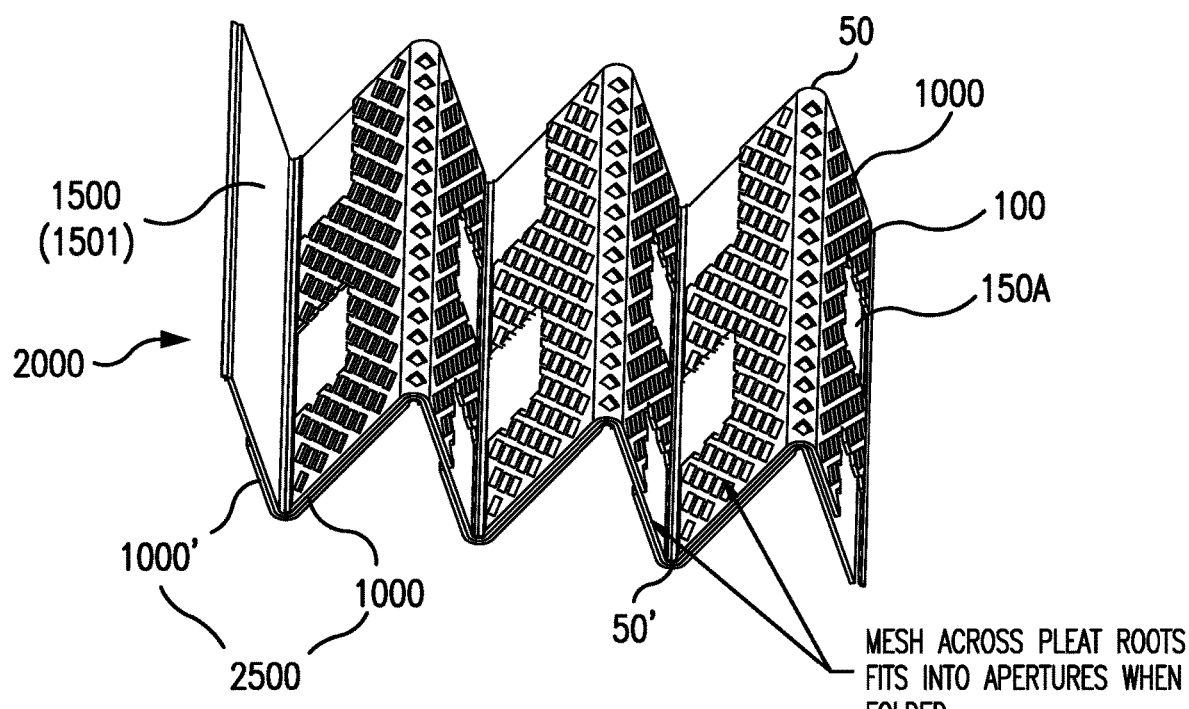
Figure 2C:
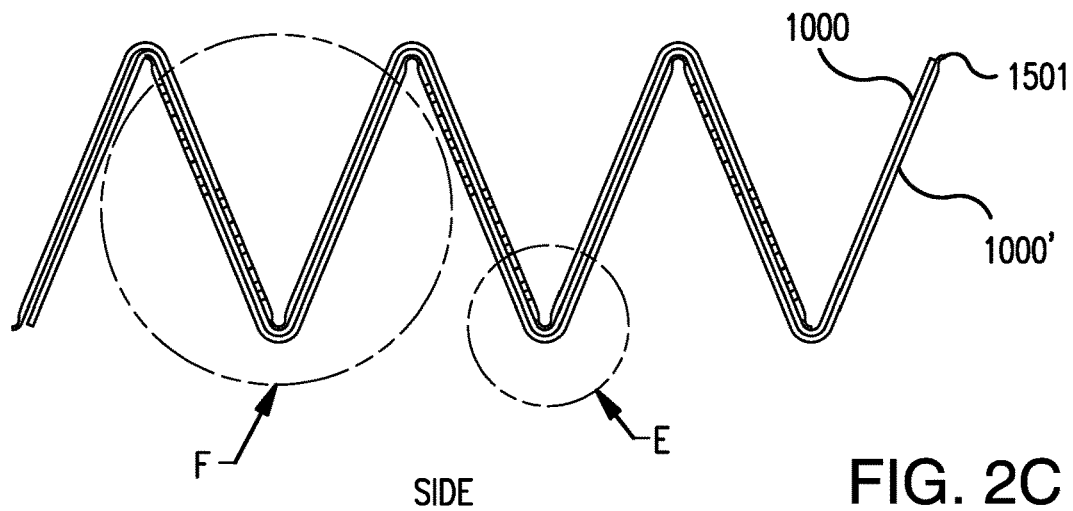
Figure 2D:
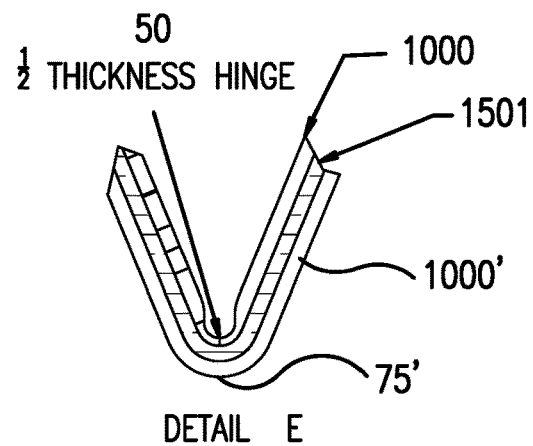
Figure 2E:
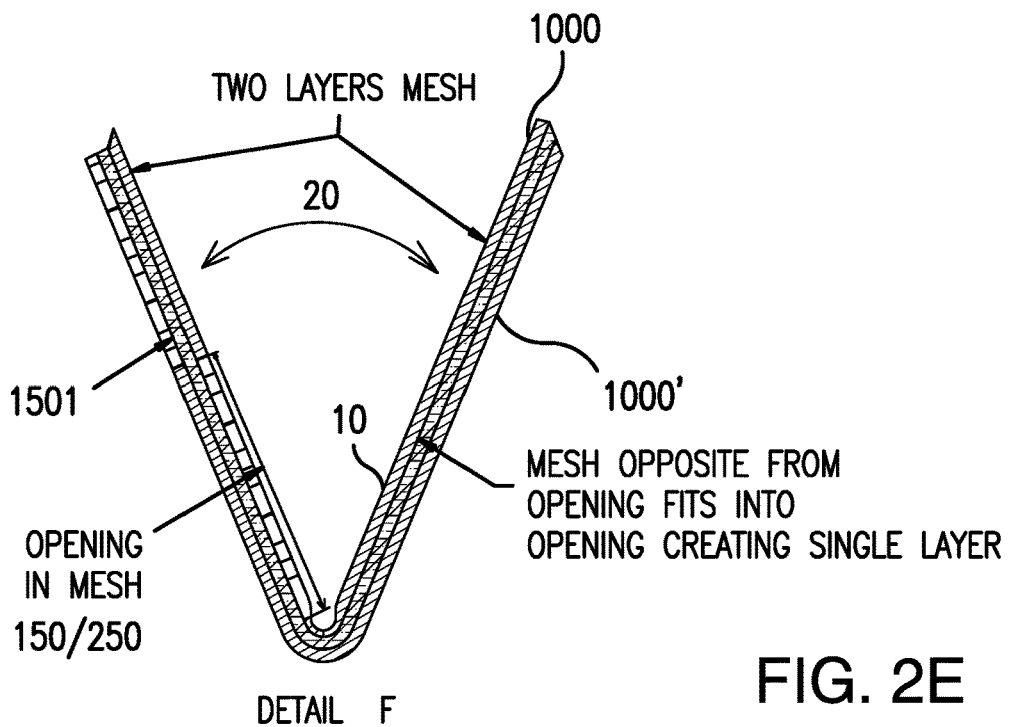

FIGS. 2A-2E show various diagrammatic views of an embodiment of a support and drainage system comprising partially folded first and second support and drainage materials shown in FIG. 1A, with a pleated filter between the first and second support and drainage materials. FIG. 2A shows a top view, FIG. 2B shows a top perspective view, FIG. 2C show a side view; FIGS. 2D and 2E show, respectively, enlarged views of details E and F as shown in FIG. 2C.

Figure 3C:
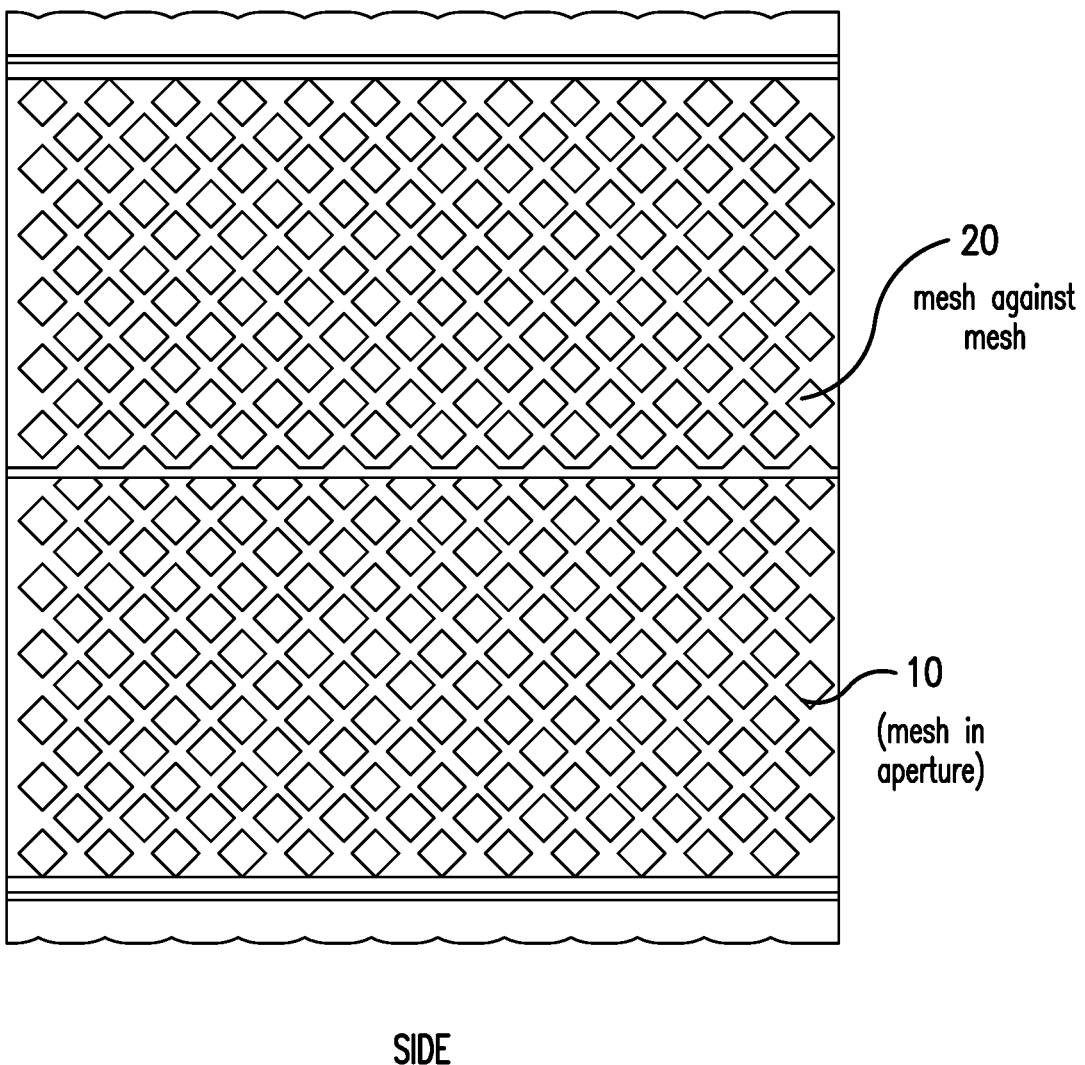

FIGS. 3A-3C show various diagrammatic views of the support and drainage system and the filter system shown in FIGS. 2A-2E, wherein the support and drainage materials are fully folded, and the edge strips have been removed, such that the remaining sides of the support and drainage material are flush with the ends of the filter media, and sealed together to prevent flow. FIG. 3A shows an orthogonal view, FIG. 3B shows a front view, and FIG. 3C shows a side view.

Figure 4B:
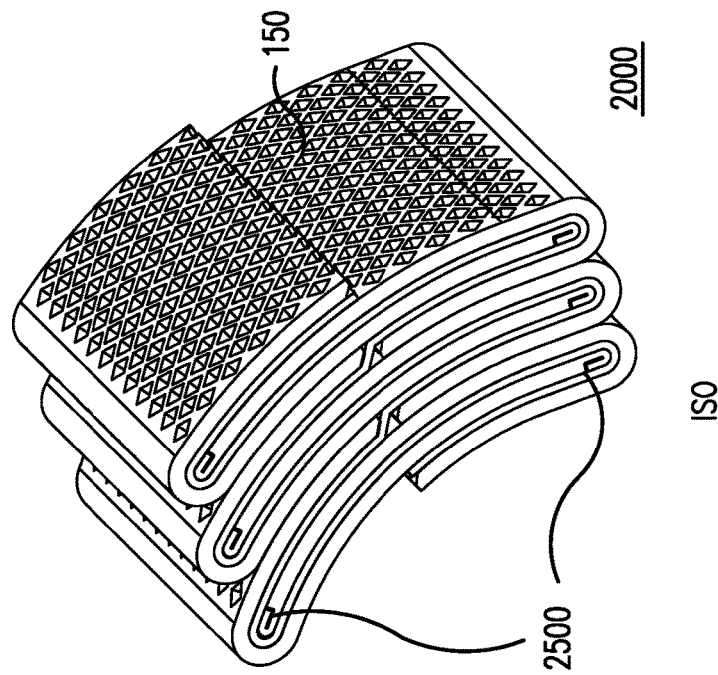
Figure 4A:
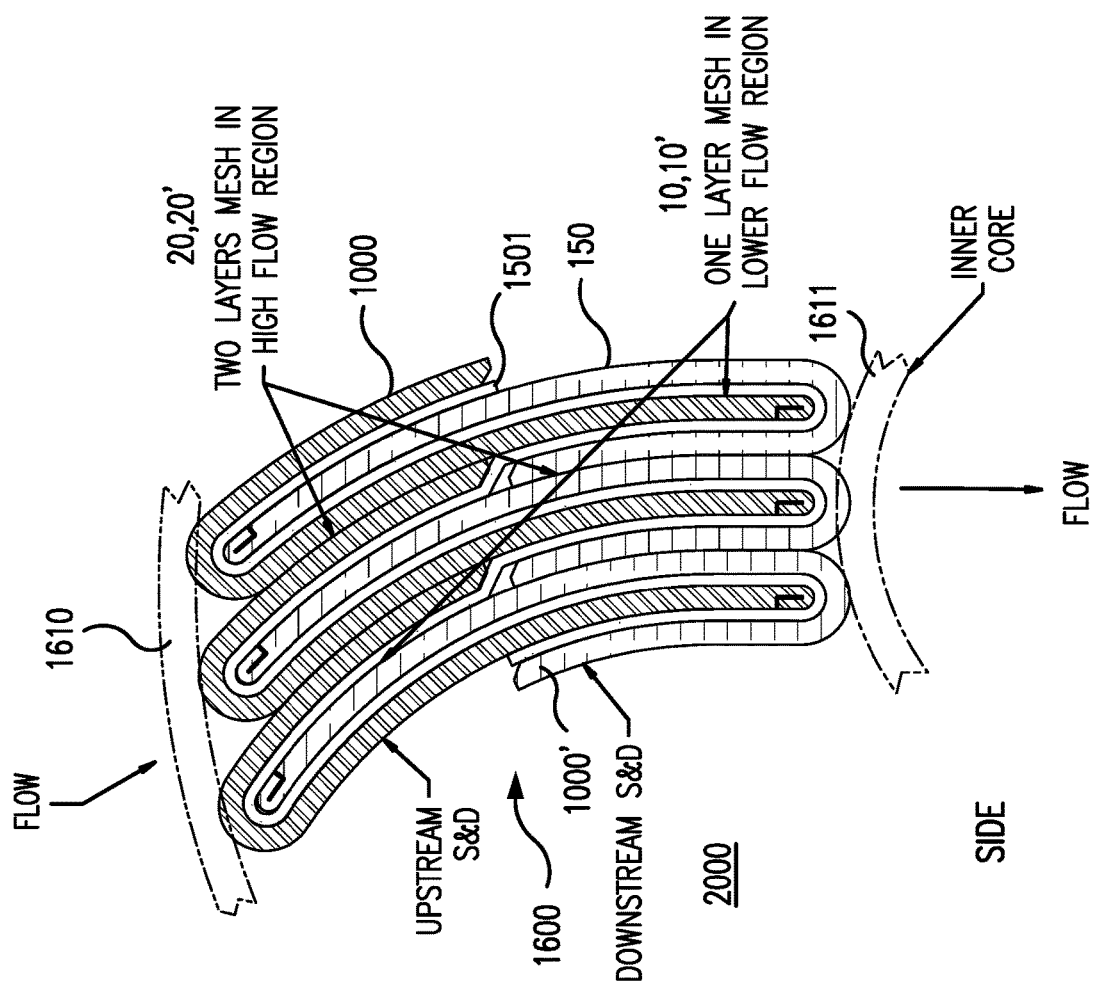
Figure 4C:
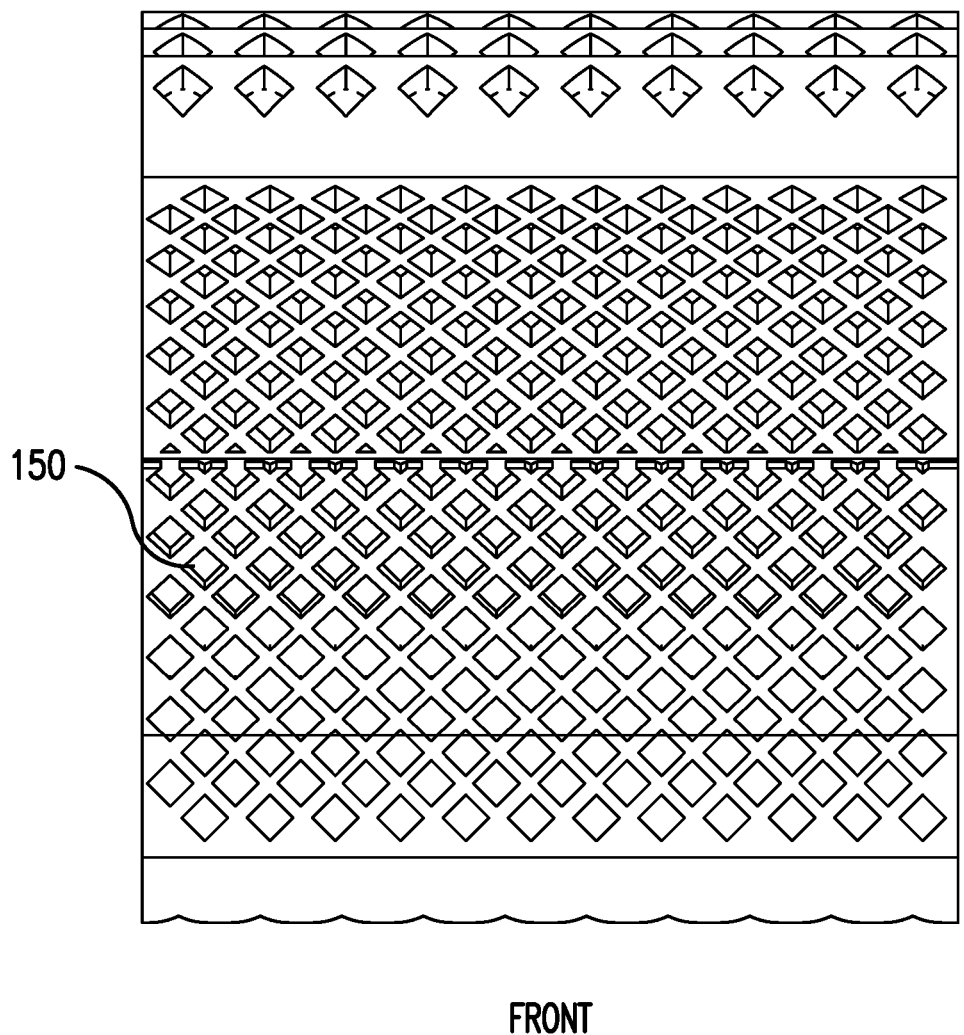

FIGS. 4A-4C show an embodiment of a filter cartridge comprising a filter cage and a pleated filter, wherein the pleated filter has a laid-over-pleat (LOP) configuration, and embodiments of support and drainage materials as generally shown in FIG. 1 arranged between each pleat of the pleated. FIG. 4A shows a side view; FIG. 4B shows an isometric view; and FIG. 4C shows a front view.

Figure 5A:
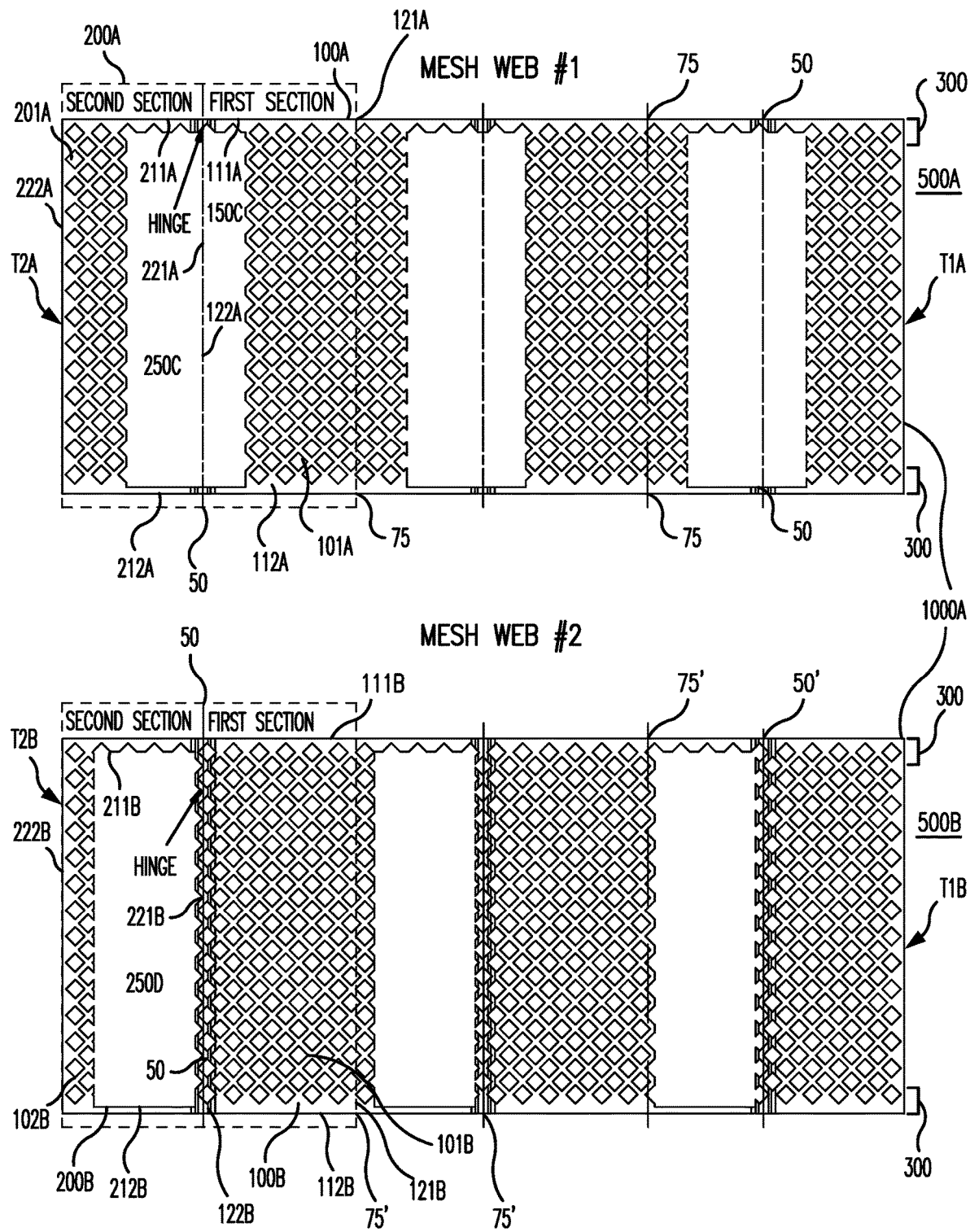
Figure 5B:
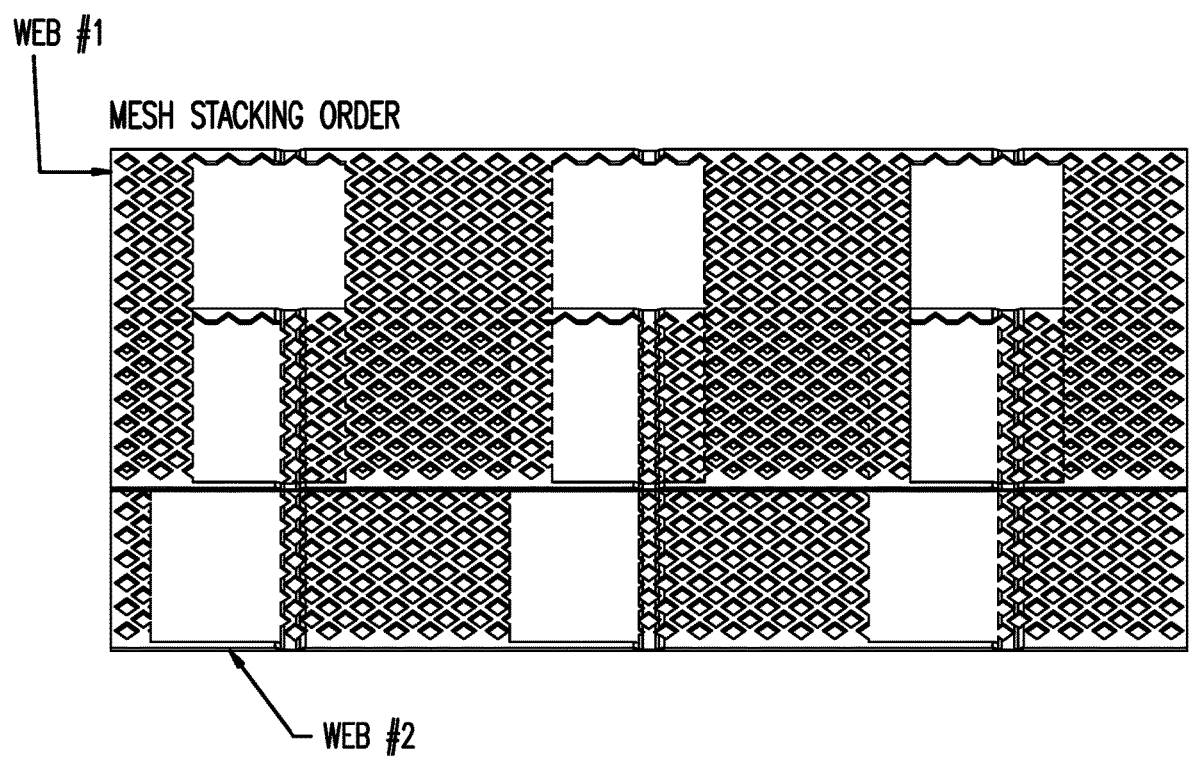

FIGS. 5A-5B show top views of an unfolded support and drainage material according to another embodiment of the invention, wherein the material comprises mesh(es) or non-woven fabric(s), also showing first and second foldable layers, each foldable layer including a plurality of first and second sections, wherein the first sections are connected to the second sections, some sections comprising apertures. FIG. 5A shows separate first and second foldable layers, wherein the first sections are connected to the second sections by reduced-thickness hinges, also showing folding locations; FIG. 5B shows the first foldable layer placed on the second foldable layer, wherein the hinges have been removed from the first foldable layer.

Figure 6A:
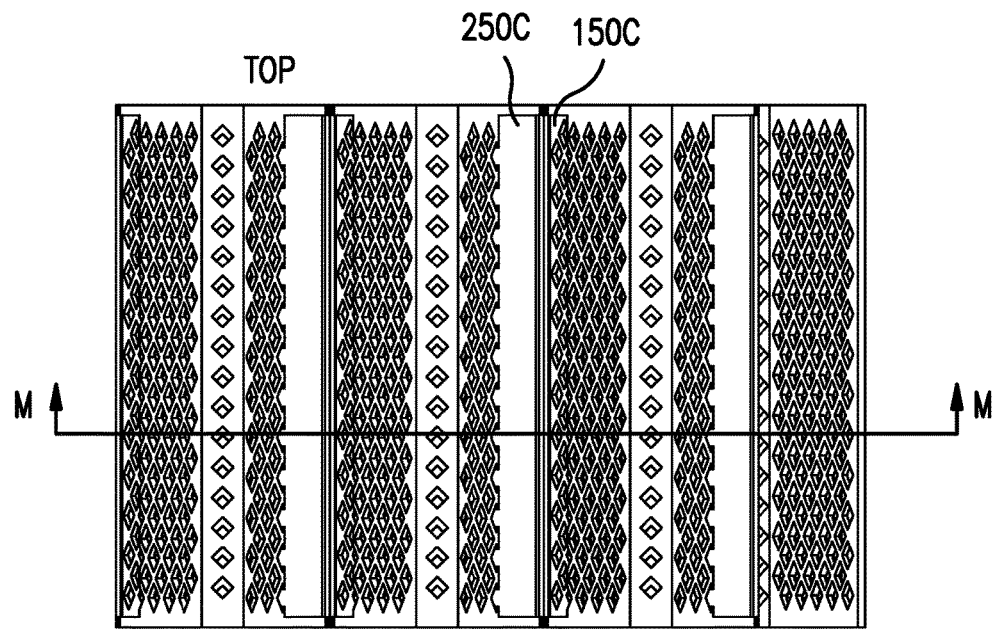
Figure 6B:
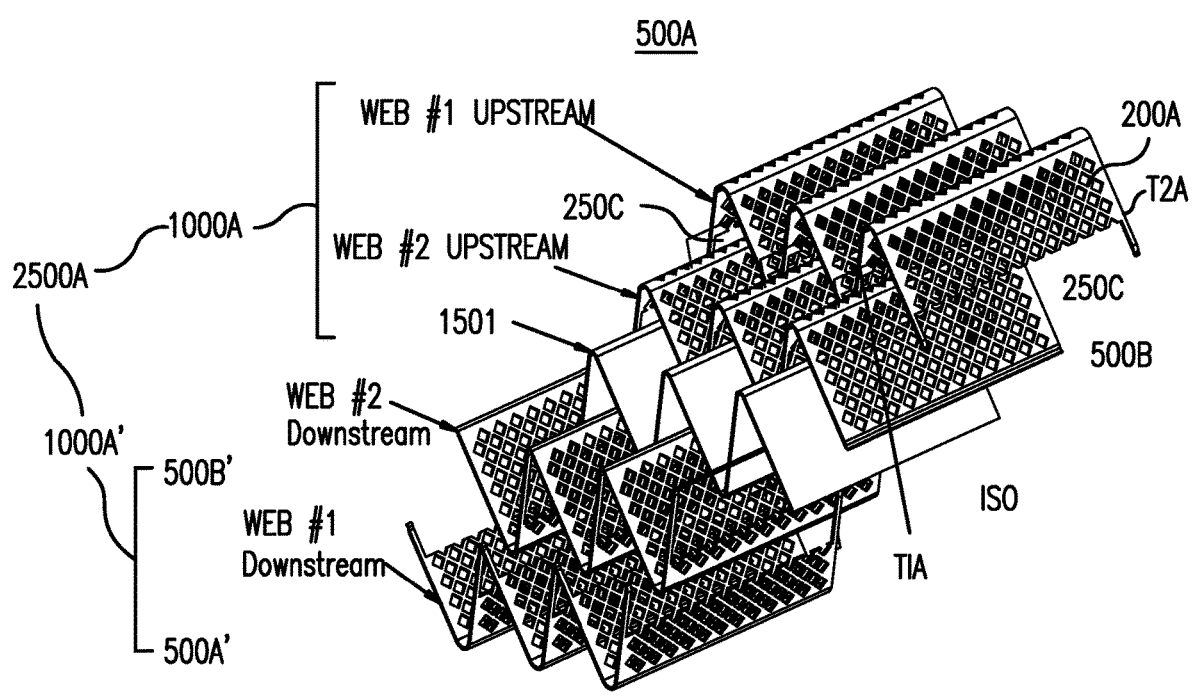
Figure 6C:
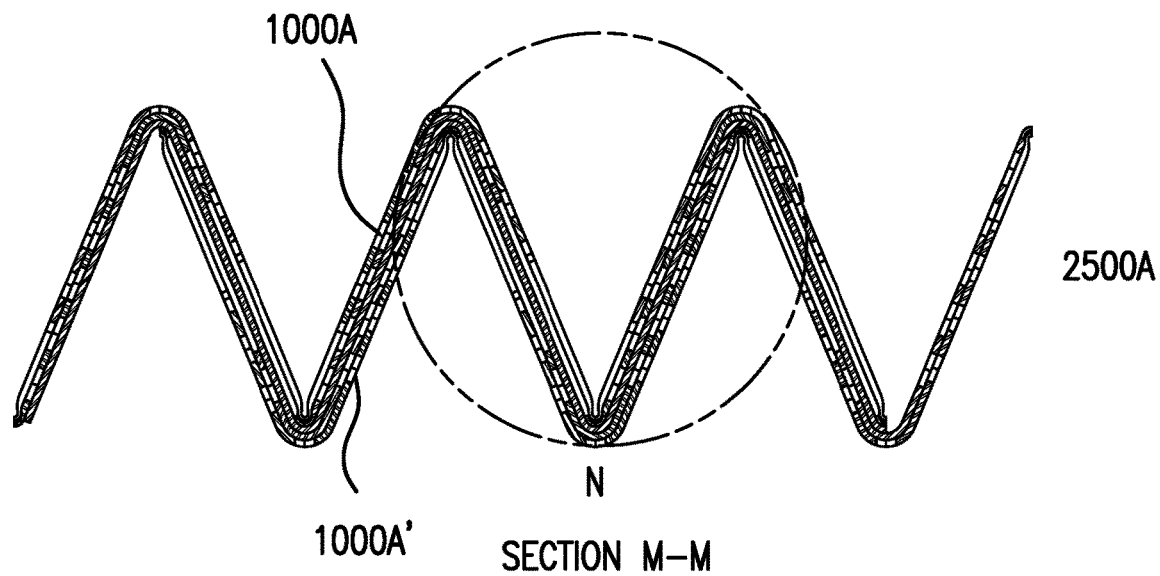
Figure 6D:
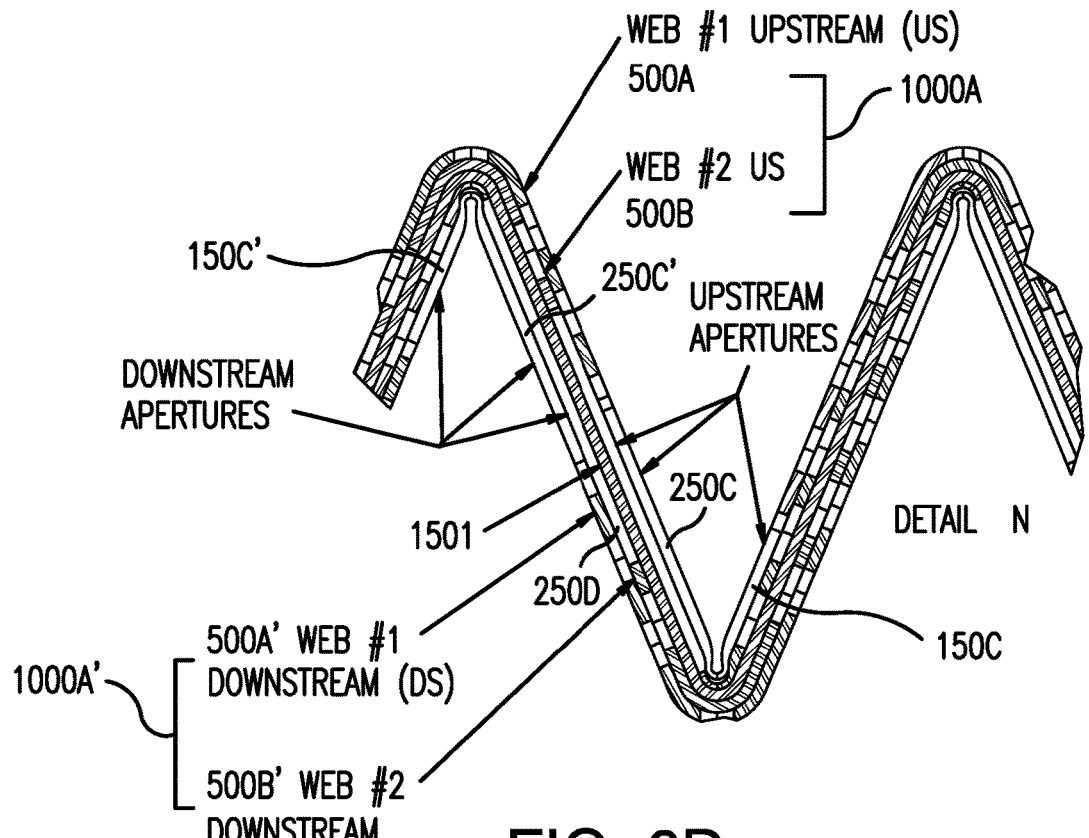

FIGS. 6A-6D show various diagrammatic views of an embodiment of a support and drainage system comprising partially folded first and second support and drainage materials (each comprising first and second foldable layers) as shown in FIG. 5B, with a pleated filter between the first and second support and drainage materials. FIG. 6A shows a top view, FIG. 6B shows a top perspective exploded view, FIG. 6C show a side view along sectional view M-M as shown in FIG. 6A; FIG. 6D shows an enlarged views of detail N as shown in FIG. 6C.

Figure 7:
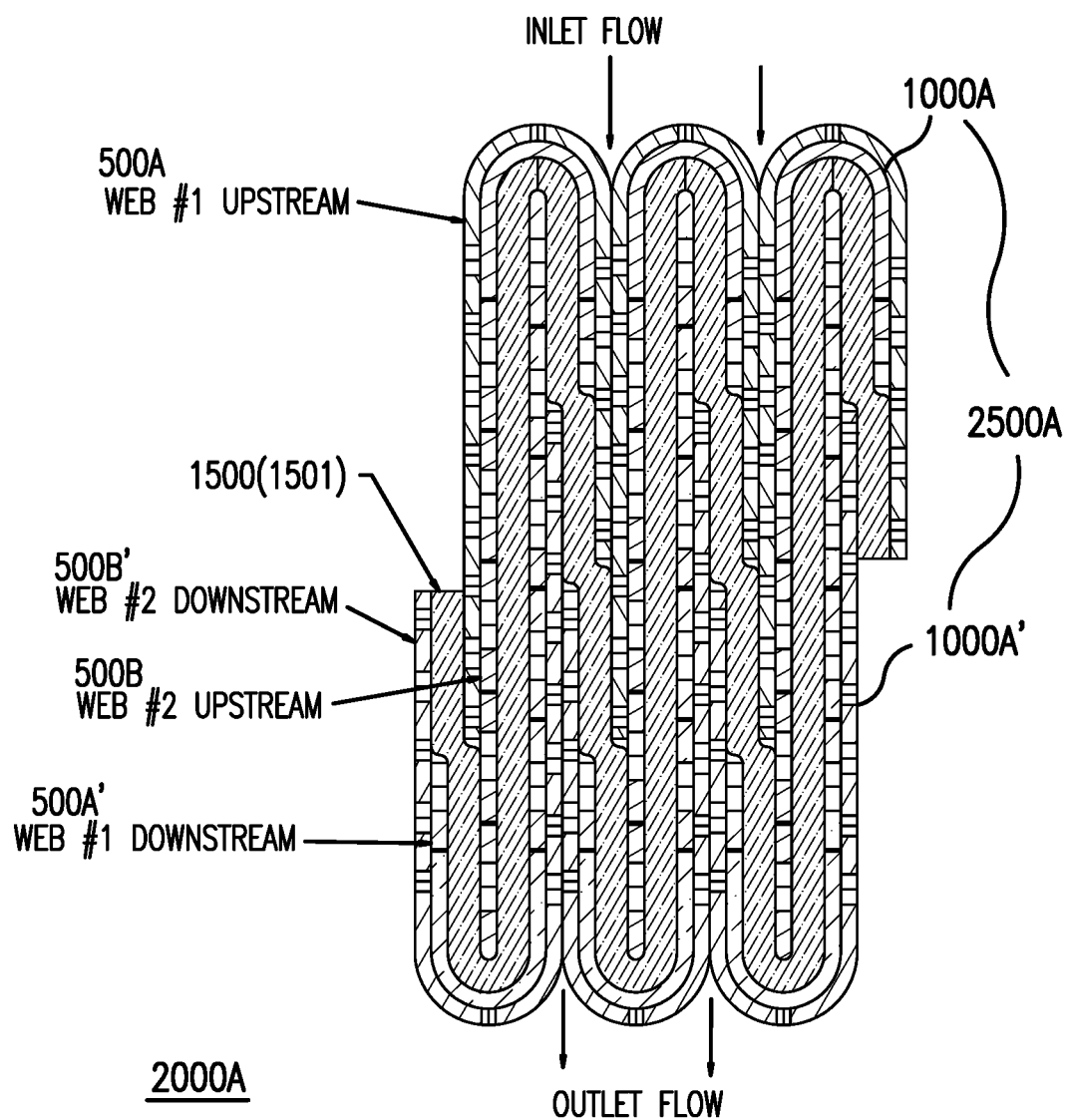

FIG. 7 shows a side view of the support and drainage system comprising a filter system shown in FIGS. 6A-6D (with arrows showing the fluid flow), wherein the first and second support and drainage materials are fully folded.

Figure 8A:
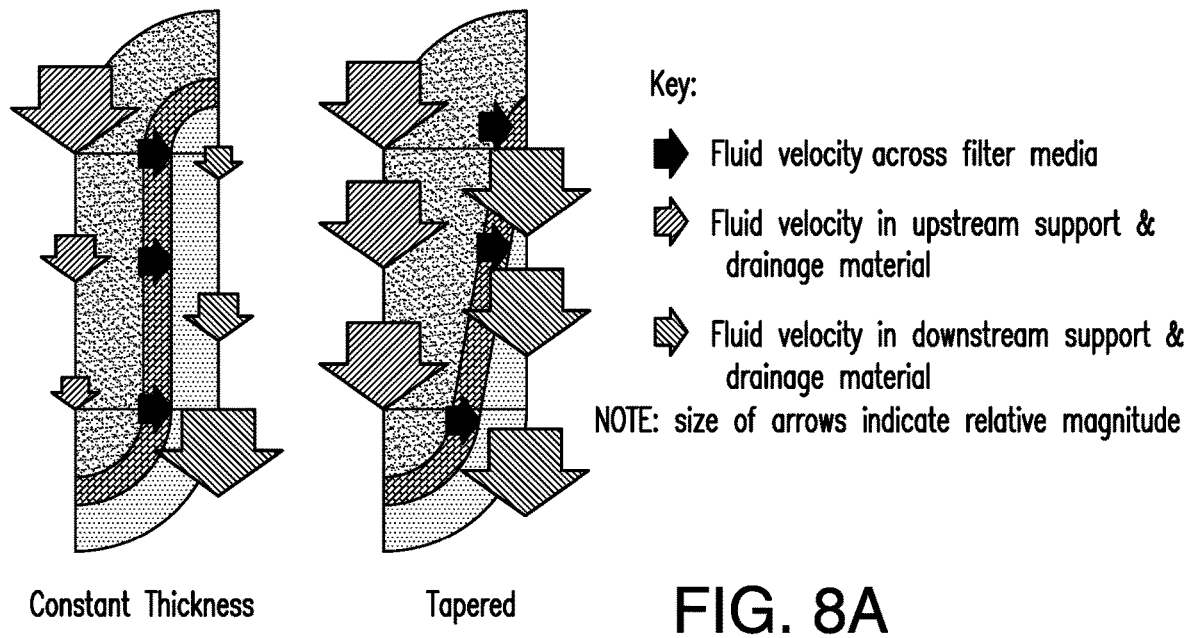
Figure 8B:
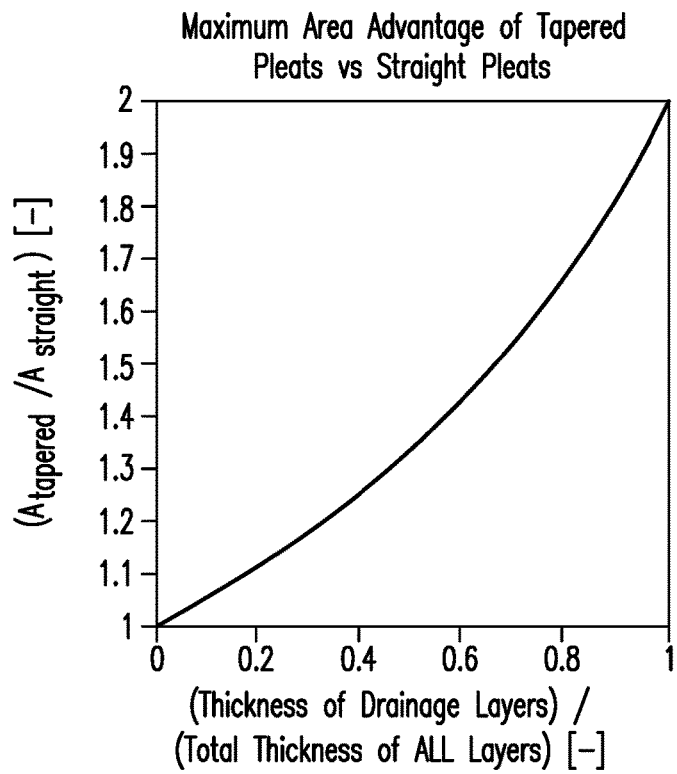

FIG. 8A shows, diagrammatically, the difference in fluid velocity across the filter media and in upstream and downstream support and drainage (S&D) material through the half pleat of a pleated filter medium with conventional constant thickness S&D materials (on the left) compared to S&D materials according to an embodiment of the invention (on the right). FIG. 8B shows the illustrative advantage in maximum filter area in a pleated filter with tapered S&D material compared to conventional constant thickness S&D material.

DETAILED DESCRIPTION OF THE INVENTION

In accordance with an embodiment of the present invention, a support and drainage material comprises a foldable element allowing fluid flow through, the element comprising at least one first section comprising a mesh or a non-woven fabric having a first end and a second end, a first side and a second side, a first major surface and a second major surface, and a first section bulk between the first major surface and the second major surface, the first section bulk having a thickness extending from the first end to a portion of the second end; wherein the at least one first section further comprises at least one first section aperture extending a length of about 25% to about 75% a distance between the first end and the second end, and extending a length of about 2% to about 100% a distance between the first side and the second side; and/or at least one second section comprising a mesh or a non-woven fabric having a first end and a second end, a first side and a second side, a first major surface and a second major surface, and a second section bulk between the first major surface and the second major surface, the second section bulk having a thickness extending from the first end to a portion of the second end; wherein the at least one second section further comprises at least one second section aperture extending a length of about 25% to about 75% a distance between the first end and the second end, and extending a length of about 2% to about 100% a distance between the first side and the second side; wherein, when the foldable element is folded, a part of the first section bulk thickness fits in the at least one aperture of the at least one second section, and/or a part of the second section bulk thickness fits in the at least one aperture of the at least one first section.

In an embodiment, the support and drainage material further comprises an additional first section and an additional second section, wherein the additional first section is connected to the second section, and the additional second section is connected to the additional first section; wherein, when the foldable element is folded, a part of the additional first section bulk thickness fits in the at least one aperture of the additional second section, and a part of the additional second section bulk thickness fits in the at least one aperture of the additional first section. In some embodiments, the additional first section is connected to the second section by a foldable connection, and the additional second section is connected to the additional first section by a reduced-thickness hinge.

In some embodiments of the support and drainage material, the folded element provides tapered flow channels each having at least two steps.

In an embodiment, the at least one first section has two or more first section apertures, each extending a length of about 25% to about 75% a distance between the first end and the second end; and the at least one second section has two or more single second section apertures, each extending a length of about 25% to about 75% a distance between the first end and the second end.

In another embodiment, a support and drainage material system is provided, comprising a first support and drainage material allowing fluid flow through and a second separate support and drainage material allowing fluid flow through; (a) the first support and drainage material comprising a first foldable element allowing fluid flow through, the first foldable element comprising at least one first section comprising a mesh or a non-woven fabric having a first end and a second end, a first side and a second side, a first major surface and a second major surface, and a first section bulk between the first major surface and the second major surface, the first section bulk having a thickness extending from the first end to a portion of the second end; wherein the at least one first section further comprises at least one first section aperture extending a length of about 25% to about 75% a distance between the first end and the second end, and extending a length of about 2% to about 100% a distance between the first side and the second side; and/or at least one second section comprising a mesh or a non-woven fabric having a first end and a second end, a first side and a second side, a first major surface and a second major surface, and a second section bulk between the first major surface and the second major surface, the second section bulk having a thickness extending from the first end to a portion of the second end; wherein the at least one second section further comprises at least one second section aperture extending a length of about 25% to about 75% a distance between the first end and the second end, and extending a length of about 2% to about 100% a distance between the first side and the second side; wherein, when the first foldable element is folded, a part of the first section bulk thickness fits in the at least one aperture of the at least one second section, and/or a part of the second section bulk thickness fits in the at least one aperture of the at least one first section; and, (b) the second support and drainage material comprising a second foldable element allowing fluid flow through, the second foldable element comprising at least one first section comprising a mesh or a non-woven fabric having a first end and a second end, a first side and a second side, a first major surface and a second major surface, and a first section bulk between the first major surface and the second major surface, the first section bulk having a thickness extending from the first end to a portion of the second end; wherein the at least one first section further comprises at least one first section aperture extending a length of about 25% to about 75% a distance between the first end and the second end, and extending a length of about 2% to about 100% a distance between the first side and the second side; and/or at least one second section comprising a mesh or a non-woven fabric having a first end and a second end, a first side and a second side, a first major surface and a second major surface, and a second section bulk between the first major surface and the second major surface, the second section bulk having a thickness extending from the first end to a portion of the second end; wherein the at least one second section further comprises at least one second section aperture extending a length of about 25% to about 75% a distance between the first end and the second end, and extending a length of about 2% to about 100% a distance between the first side and the second side; wherein, when the second foldable element is folded, a part of the first section bulk thickness fits in the at least one aperture of the at least one second section, and/or a part of the second section bulk thickness fits in the at least one aperture of the at least one first section.

A support and drainage material according to another embodiment of the invention comprises a foldable element allowing fluid flow through, the element comprising (A) a first foldable layer comprising (i) at least one first section comprising a mesh or a non-woven fabric having a first end and a second end, a first side and a second side, a first major surface and a second major surface, and a first section bulk between the first major surface and the second major surface, the first section bulk having a thickness extending from the first end toward the second end without reaching the second end; wherein the at least one first section further comprises at least one first section aperture extending a length of about 15% to about 35% a distance between the first end and the second end, and extending a length of about 2% to about 100% a distance between the first side and the second side; and, (ii) at least one second section comprising a mesh or a non-woven fabric having a first end and a second end, a first side and a second side, a first major surface and a second major surface, and a second section bulk between the first major surface and the second major surface, the second section bulk having a thickness extending from the second end toward the first end without reaching the first end; wherein the at least one second section further comprises at least one second section aperture extending a length of about 40% to about 60% a distance between the second end and the first end, and extending a length of about 2% to about 100% a distance between the first side and the second side; and, (B) a second foldable layer comprising (iii) at least one first section comprising a mesh or a non-woven fabric having a first end and a second end, a first side and a second side, a first major surface and a second major surface, and a first section bulk between the first major surface and the second major surface, the first section bulk having a thickness extending from the second end to the first end; and, (iv) at least one second section comprising a mesh or a non-woven fabric having a first end and a second end, a first side and a second side, a first major surface and a second major surface, and a second section bulk between the first major surface and the second major surface; the second section bulk having a thickness extending from the second end toward the first end without reaching the first end; wherein the at least one second section further comprises at least one second section aperture extending a length of about 65% to about 85% a distance between the first end and the second end, and extending a length of about 2% to about 100% a distance between the first side and the second side; wherein the first foldable layer (A) is placed on top of the second foldable layer (B); and wherein, when the foldable element is folded, a part of the first section bulk thickness and/or a part of the second bulk thickness of the first foldable layer (A) fits in some of the at least one apertures of the at least one second section of the second foldable layer (B); and/or a part of the first section bulk thickness of the second foldable layer (B) fits in some of the at least one apertures of the at least one first section and/or the at least one apertures of the at least one second section of the first foldable layer (A).

Another embodiment of a support and drainage material system comprises a first support and drainage material allowing fluid flow through and a second separate support and drainage material allowing fluid flow through; (a) the first support and drainage material comprising a first foldable element allowing fluid flow through, the foldable element comprising (A) a first foldable layer comprising (i) at least one first section comprising a mesh or a non-woven fabric having a first end and a second end, a first side and a second side, a first major surface and a second major surface, and a first section bulk between the first major surface and the second major surface, the first section bulk having a thickness extending from the first end toward the second end without reaching the second end; wherein the at least one first section further comprises at least one first section aperture extending a length of about 15% to about 35% a distance between the first end and the second end, and extending a length of about 2% to about 100% a distance between the first side and the second side; and, (ii) at least one second section comprising a mesh or a non-woven fabric having a first end and a second end, a first side and a second side, a first major surface and a second major surface, and a second section bulk between the first major surface and the second major surface, the second section bulk having a thickness extending from the second end toward the first end without reaching the first end; wherein the at least one second section further comprises at least one second section aperture extending a length of about 40% to about 60% a distance between the second end and the first end, and extending a length of about 2% to about 100% a distance between the first side and the second side; and, (B) a second foldable layer comprising (iii) at least one first section comprising a mesh or a non-woven fabric having a first end and a second end, a first side and a second side, a first major surface and a second major surface, and a first section bulk between the first major surface and the second major surface, the first section bulk having a thickness extending from the second end to the first end; and, (iv) at least one second section comprising a mesh or a non-woven fabric having a first end and a second end, a first side and a second side, a first major surface and a second major surface, and a second section bulk between the first major surface and the second major surface; the second section bulk having a thickness extending from the second end toward the first end without reaching the first end; wherein the at least one second section further comprises at least one second section aperture extending a length of about 65% to about 85% a distance between the first end and the second end, and extending a length of about 2% to about 100% a distance between the first side and the second side; wherein the first foldable layer (A) is placed on top of the second foldable layer (B); and wherein, when the foldable element is folded, a part of the first section bulk thickness and/or a part of the second bulk thickness of the first foldable layer (A) fits in some of the at least one apertures of the at least one second section of the second foldable layer (B); and/or a part of the first section bulk thickness of the second foldable layer (B) fits in some of the at least one apertures of the at least one first section and/or the at least one apertures of the at least one second section of the first foldable layer (A); and, (b) the second support and drainage material comprising a second foldable element allowing fluid flow through, the second foldable element comprising (C) a first foldable layer comprising (i) at least one first section comprising a mesh or a non-woven fabric having a first end and a second end, a first side and a second side, a first major surface and a second major surface, and a first section bulk between the first major surface and the second major surface, the first section bulk having a thickness extending from the first end toward the second end without reaching the second end; wherein the at least one first section further comprises at least one first section aperture extending a length of about 15% to about 35% a distance between the first end and the second end, and extending a length of about 2% to about 100% a distance between the first side and the second side; and, (ii) at least one second section comprising a mesh or a non-woven fabric having a first end and a second end, a first side and a second side, a first major surface and a second major surface, and a second section bulk between the first major surface and the second major surface, the second section bulk having a thickness extending from the second end toward the first end without reaching the first end; wherein the at least one second section further comprises at least one second section aperture extending a length of about 40% to about 60% a distance between the second end and the first end, and extending a length of about 2% to about 100% a distance between the first side and the second side; and, (D) a second foldable layer comprising (iii) at least one first section comprising a mesh or a non-woven fabric having a first end and a second end, a first side and a second side, a first major surface and a second major surface, and a first section bulk between the first major surface and the second major surface, the first section bulk having a thickness extending from the second end to the first end;

and, (iv) at least one second section comprising a mesh or a non-woven fabric having a first end and a second end, a first side and a second side, a first major surface and a second major surface, and a second section bulk between the first major surface and the second major surface; the second section bulk having a thickness extending from the second end toward the first end without reaching the first end; wherein the at least one second section further comprises at least one second section aperture extending a length of about 65% to about 85% a distance between the first end and the second end, and extending a length of about 2% to about 100% a distance between the first side and the second side; wherein the first foldable layer (C) is placed on top of the second foldable layer (D); and wherein, when the foldable element is folded, a part of the first section bulk thickness and/or a part of the second bulk thickness of the first foldable layer (C) fits in some of the at least one apertures of the at least one second section of the second foldable layer (D); and/or a part of the first section bulk thickness of the second foldable layer (D) fits in some of the at least one apertures of the at least one first section and/or the at least one apertures of the at least one second section of the first foldable layer (C).

A filter arrangement according to an embodiment of the invention comprises a pleated porous filter having a plurality of pleats and having an upstream surface and a downstream surface; and, an embodiment of the support and drainage material, arranged to contact the upstream surface of the pleated porous filter, or to contact the downstream surface of the pleated porous filter.

In another embodiment, a filter system is provided comprising a pleated porous filter having a plurality of pleats and having an upstream surface and a downstream surface; and, an embodiment of the support and drainage material system, wherein the pleated porous filter is arranged between the first support and drainage material and the second support and drainage material.

In an embodiment of the filter system, the pleated porous filter comprises a laid-over-pleat filter. Alternatively, or additionally, in an embodiment of the filter system, the system further comprises an inner core and an outer cage.

A method of filtering fluid according to an embodiment of the invention comprises passing a fluid through an embodiment of the filter system, including passing fluid through the first support and drainage material, the upstream surface of the pleated porous filter, the downstream surface of the pleated porous filter, and the second support and drainage material.

Advantageously, the support and drainage materials, when placed between layers of filter media (pleated or non-pleated), provide support and uniform spacing (including reducing or preventing nesting wherein strands of mesh on opposing surfaces fit between one another rather than to lie atop one another), while exhibiting reduced edgewise flow resistance (such that the pressure drop in the support and drainage material is less than the pressure drop across the filter element), thereby providing an even distribution of fluid across the surface of the filter element and reduced face loss.

When used with a pleated filter, they can reduce filter media damage (especially membrane damage) and allow more uniform flow distribution (including flow through the pleated tip of the filter), and provide a stable pleat-pack. Additionally, support and drainage materials including hinges are compatible with conventional pleating devices.

Furthermore, when used with a pleated filter, the use of tapered materials can lead to an overall thinner pleat pitch, allowing more filter material in a given volume, while maintaining a desirable pressure differential, and improving filtration efficiency.

Moreover, in contrast with conventional constant thickness support and drainage elements, wherein the inventors have found wasted area as the local flow rate is not correlated with the needed flow area, the inventive support and drainage materials can advantageously better match the local flow rate to the needed flow area.

Illustratively, FIG. 8A shows, diagrammatically, the difference in fluid velocity across the filter media and in upstream and downstream support and drainage (S&D) material through the half pleat of a pleated filter medium with conventional constant thickness S&D materials (on the left) compared to S&D materials according to an embodiment of the invention (on the right). In contrast with conventional constant thickness S&D elements, wherein area is wasted as the local flow rate is not correlated with the needed flow area allowing the velocity to vary, the inventive S&D materials can advantageously better match the local flow rate to the needed flow area keeping the velocity constant. FIG. 8B shows the illustrative advantage in maximum filter area in a pleated filter with tapered S&D material compared to conventional constant thickness S&D material, wherein "0" on the horizontal axis indicates that the S&D material is infinitesimally thin and there is no possibility of increasing the filter area by tapering the S&D material, and "1" on the horizontal axis indicates that the filter material is infinitesimally thin in which case the filter area can be increased by a factor of two. FIG. 8B suggests a maximum that can be achieved in the limit of one end of the S&D material tapering to zero thickness, real situations will fall below this curve.

Embodiments of the invention are suitable for use with a variety of filter configurations, including flat pleat filter packs, direct flow spiral filters, stacked disk filters, crossflow cassettes, and are particularly suitable for "laid-over-pleat" (LOP) filter configurations (as described in, for example, U.S. Pat. No. 5,543,047).

Each of the components of the invention will now be described in more detail below, wherein like components have like reference numbers. Where upstream and downstream S&D materials are each illustrated with the same components, the corresponding components are identified with similar reference numbers, followed by "'", e.g., 100' corresponds to 100; 200' corresponds to 200, 1000' corresponds to 1000, etc.

FIG. 1A shows a top view of an unfolded support and drainage material 1000 according to an embodiment of the invention, wherein the material comprises a foldable element 500 allowing fluid flow through, the element comprising mesh(es) or non-woven fabric(s), showing at least one section including at least one aperture, typically at least first section 100 and at least one second section 200 (following the first section) connected by a hinge 50 (as shown in FIGS. 1B and 1C, showing a reduced thickness hinge 50, typically utilized as an inner hinge), also showing a folding location 75 (e.g., providing a foldable connection such as a non-reduced thickness hinge) between a second section followed by a first section.

As will be described in more detail below, when support and drainage materials are arranged upstream and downstream of a pleated filter, one support and drainage material has an inner hinge (typically having a reduced (e.g., half) thickness to essentially maintain a single layer thickness when folded) contacting and supporting the pleat root, and the other support and drainage material has a folding location such as an outer hinge (having a non-reduced thickness) contacting and protecting the pleat tip, the hinges allowing fluid flow therethrough.

The at least one first section comprising a mesh or a non-woven fabric has a first end 121 and a second end 122, a first side 111 and a second side 112, a first major surface 101 and a second major surface 102, and a first section bulk T1 between the first major surface and the second major surface, the first section bulk having a thickness extending from the first end to a portion P1 of the second end (i.e., the bulk thickness extends from the first end to the second end where no aperture is present); wherein the at least one first section further comprises at least one first section aperture 150, extending a length of about 25% to about 75% a distance between the first end and the second end, and extending a length of about 2% to about 100% a distance between the first side and the second side; and/or the at least one second section comprising a mesh or a non-woven fabric having a first end 221 and a second end 222, a first side 211 and a second side 212, a first major surface 201 and a second major surface 202, and a second section bulk T2 between the first major surface and the second major surface, the second section bulk having a thickness extending from the first end to a portion P2 of the second end; wherein the at least one second section further comprises at least one second section aperture extending a length of about 25% to about 75% a distance between the first end and the second end (i.e., the bulk thickness extends from the first end to the second end where no aperture is present), and extending a length of about 2% to about 100% a distance between the first side and the second side; wherein, when the foldable element is folded (as discussed in more detail, and as shown in, for example, FIGS. 2E, 3B, 4A, 6D, and 7), a part of the first section bulk thickness fits in the at least one aperture of the at least one second section, and/or a part of the second section bulk thickness fits in the at least one aperture of the at least one first section, providing tapered flow channels each having at least two steps.

The embodiment illustrated in FIG. 1A (see also, FIG. 5A) includes edge strips 300 that are typically removed in assembling the filter system (comprising S&D materials upstream and downstream of the pleated porous filter). Thus, when referring to the lengths of distances between the first side and the second side of various apertures, the measurement refers to the portion of the first or second section contacting the edge of the edge strip where the strip is to be cut/removed.

Preferably, and as shown in FIGS. 1A and 1B, embodiments of the support and drainage material further comprise a plurality of first sections 100 and second sections 200, e.g., a plurality of additional first sections and a plurality of additional second sections (preferably providing a continuous sheet along the length of the filter), wherein an additional first section is connected to the second section, and an additional second section is connected to the additional first section (and so on); wherein, when the foldable element is folded, a part of the additional first section bulk thickness fits in the at least one aperture of the additional second section, and a part of the additional second section bulk thickness fits in the at least one aperture of the additional first section. Typically, at least one connection is via a reduced-thickness hinge. For example, using FIGS. 1A and 1B for reference, there is a reduced-thickness hinge 50 connecting the first section and second section at the most left hand portion of the figures, wherein, moving to the right, there is a folding location 75 where the second section 200 will connect to the additional first section 100, e.g., by a foldable connection such as a non-reduced thickness hinge.

Preferably, and as also shown in FIG. 1, the first and/or second section includes a plurality of apertures, e.g., wherein the at least one first section 100 has two or more first section apertures 150A, 150B, each extending a length of at least about 25% to about 75% a distance between the first end and the second end; and the at least one second section has two or more single second section apertures 250A, 250B, each extending a length of about 25% to about 75% a distance between the first end and the second end.

Embodiments of support and drainage materials can be arranged upstream of downstream of pleated porous filters to provide an embodiment of a filter arrangement. Preferably, embodiments of support and drainage material systems comprise an embodiment of a first support and drainage material arranged upstream of a pleated porous filter, and an embodiment of a second support and drainage material arranged downstream of the pleated porous filter, also providing an embodiment of a filter system comprising the support and drainage material system and the pleated porous filter.

FIG. 2 shows various diagrammatic views of an embodiment of a support and drainage system 2500 comprising partially folded first and second support and drainage materials as shown in FIG. 1A (1000 first/upstream, 1000' second/downstream), with a porous pleated filter 1500 comprising a porous pleated filter element 1501 between the first and second support and drainage materials, as well as an embodiment of a filter system 2000 comprising the pleated filter 1500 between first and second support and drainage materials 1000, 1000'.

FIG. 2A shows a top view, FIG. 2B shows a top perspective view, FIG. 2C show a side view; FIGS. 2D and 2E show enlarged E and F detail views as shown in FIG. 2C, wherein FIG. 2D shows reduced thickness at the inner hinge 50 of support and drainage material 1000 contacting the pleat root (with folding location 75' of support and drainage material 1000' contacting the pleat tip; optionally, a hinge 50' could replace foldable line 75'; FIG. 1C also shows a reduced-thickness inner hinge), and FIG. 2E shows how one section's bulk thickness can fit in an aperture of another section. Using FIG. 2E for reference, when the support and drainage materials are fully folded, a part of one section's bulk thickness fits in an aperture of another section (lower part of FIG. 2E), and another part of one section's bulk thickness contacts the other section's bulk thickness (mesh contacting mesh in the upper part of FIG. 2E), the effect is to provide a tapered flow channel having two steps (mesh contacting mesh provides a first step 20 (dual mesh thickness), mesh bulk in aperture provides a second step 10 (single mesh thickness)). Advantageously, in providing the tapered thickness of the bulk, this allows for more filter media area at the same level of compression as untapered standard support and drainage media.

FIG. 3 shows various diagrammatic views of the support and drainage system 2500 and the filter system 2000 shown in FIGS. 2A-2E, wherein the support and drainage materials 1000, 1000' are fully folded, and the edge strips have been removed, such that the remaining sides of the support and drainage materials are flush with the ends of the filter media, and sealed together to prevent flow. FIG. 3A shows an orthogonal view, FIG. 3B shows a front view (with arrows showing the fluid flow, also showing outer hinges 50, 51 or outer fold locations 75, 75' protecting the pleat tips of the pleated filter, and the inner hinges 50,50' folding in on themselves and supporting the pleat roots of the pleated filter), and FIG. 3C shows a side view. As particularly shown in FIG. 3B, mesh contacting mesh provides step 20, which is essentially twice as thick as step 10, wherein mesh from one section fits in a corresponding aperture in the adjacent section.

Embodiments with curved or curvable support and drainage materials are particularly suitable for laid-over-pleat (LOP) filter configurations (as described in, for example, U.S. Pat. No. 5,543,047). For example, FIGS. 4A-4C show an embodiment of a filter cartridge 1600 comprising a filter cage 1610, an inner core 1611, and a porous LOP filter 1500 comprising a porous pleated filter element 1501, and embodiments of support and drainage materials as generally shown in FIGS. 3A-3C (providing an embodiment of a S&D element system 2500) arranged between each pleat of the pleated filter, such that two surfaces of each material contacts a face of each filter pleat, and tips of the material contacts that inner surface of the outer cage and inner core, spacing the pleat tips and pleat roots away from the cage and core, thus protecting the pleat tip and pleat root, while allowing fluid flow therethough. FIG. 4A shows a side view (with arrows showing the fluid flow; also showing two steps, 10, 10' (mesh in aperture) and 20, 20' (mesh against mesh)); FIG. 4B shows an isometric view; FIG. 4C shows a front view.

FIGS. 5-7 show other another embodiment of a support and drainage material according to another embodiment of the invention, wherein the material comprises mesh(es) or non-woven fabric(s), also showing first and second foldable layers, each foldable layer including a plurality of first and second sections connected by hinges, some sections comprising apertures, wherein the first foldable layer placed on the second foldable layer. Embodiments of support and drainage material systems and filter systems are also illustrated.

FIG. 5A shows separate first and second foldable layers, wherein the first sections are connected to the second sections by reduced-thickness hinges 50, 50', also showing folding locations 75, 75', and edge strips 300; FIG. 5B shows the first foldable layer placed on the second foldable layer (wherein the edge strips 300 including hinges 50 have been removed from the first foldable layer 500A), providing an embodiment of a support and drainage layer, wherein embodiments can be separately arranged upstream and/or downstream of a pleated filter.

As shown in more detail in FIG. 5A (see also, FIGS. 6A-6D), the illustrated embodiment of a support and drainage material 1000A comprises a foldable element allowing fluid flow through, the element comprising (A) a first foldable layer 500A comprising (i) at least one first section 100A comprising a mesh or a non-woven fabric having a first end 121A and a second end 122A, a first side 111A and a second side 112A, a first major surface 101A and a second major surface 101B, and a first section bulk T1A between the first major surface and the second major surface, the first section bulk having a thickness extending from the first end toward the second end without reaching the second end; wherein the at least one first section further comprises at least one first section aperture 150C extending a length of about 15% to about 35% a distance between the first end and the second end, and extending a length of about 2% to about 100% a distance between the first side and the second side; and, (ii) at least one second section 200A comprising a mesh or a non-woven fabric having a first end 221A and a second end 222A, a first side 211A and a second side 212A, a first major surface 201A and a second major surface 202A, and a second section bulk T2A between the first major surface and the second major surface, the second section bulk having a thickness extending from the second end toward the first end without reaching the first end; wherein the at least one second section further comprises at least one second section aperture extending a length of about 40% to about 60% a distance between the second end and the first end, and extending a length of about 2% to about 100% a distance between the first side and the second side; and, (B) a second foldable layer 500B comprising (iii) at least one first section 100B comprising a mesh or a non-woven fabric having a first end 121B and a second end 122B, a first side 111B and a second side 112B, a first major surface 101B and a second major surface 102B, and a first section bulk T1B between the first major surface and the second major surface, the first section bulk having a thickness extending from the second end to the first end; and, (iv) at least one second section 200B comprising a mesh or a non-woven fabric having a first end 221B and a second end 222B, a first side 211B and a second side 212B, a first major surface 201B and a second major surface 202B, and a second section bulk T2B between the first major surface and the second major surface; the second section bulk having a thickness extending from the second end toward the first end without reaching the first end; wherein the at least one second section further comprises at least one second section aperture 250D extending a length of about 65% to about 85% a distance between the first end and the second end, and extending a length of about 2% to about 100% a distance between the first side and the second side; wherein the first foldable layer (A) is placed on top of the second foldable layer (B); and wherein, when the foldable element is folded, a part of the first section bulk thickness and/or a part of the second bulk thickness of the first foldable layer (A) fits in some of the at least one apertures of the at least one second section of the second foldable layer (B); and/or a part of the first section bulk thickness of the second foldable layer (B) fits in some of the at least one apertures of the at least one first section and/or the at least one apertures of the at least one second section of the first foldable layer (A).

In the embodiment illustrated in FIGS. 5A and 5B, the first end 221A of the at least one second section of the first foldable layer (A) is connected to the second end 122A of the at least one second section by a reduced-thickness hinge 50 and wherein the first end 221B of the at least one second section of the second foldable layer (B) is connected to the second end 122B of the at least one first section by a reduced-thickness hinge 50'. Additionally, a folding location 75 of the first foldable layer is located between the first end 121A of the at least one first section and the second end 222A of the at least one second section, and a folding location 75' of the second foldable layer is located between the first end 121B of the at least one first section and the second end 222B of the at least one second section.

FIG. 6 shows various diagrammatic views of an embodiment of a support and drainage system comprising partially folded first and second support and drainage materials (each comprising first and second foldable layers) as shown in FIG. 5B, with a pleated filter between the first and second support and drainage materials, as well as an embodiment of a filter system comprising a pleated filter between first and second support and drainage materials. FIG. 6A shows a top view, FIG. 6B shows a top perspective exploded view, FIG. 6C show a side view along sectional view M-M as shown in FIG. 6A; FIG. 6D shows an enlarged view of detail N as shown in FIG. 6C, also showing how, once fully folded, one section's bulk thickness can fit in an aperture of another section.

Using FIGS. 6B and 6D for ease of reference (see also, FIGS. 5A and 5B), the illustrated embodiment of support and drainage material system 2500A comprises a first support and drainage material 1000A allowing fluid flow through and a second separate support and drainage material 1000A' allowing fluid flow through, (a) the first support and drainage material comprising a first foldable element allowing fluid flow through, the first foldable element comprising (A) a first foldable layer 500A comprising (i) at least one first section 100A comprising a mesh or a non-woven fabric having a first end and a second end, a first side and a second side, a first major surface and a second major surface, and a first section bulk between the first major surface and the second major surface, the first section bulk having a thickness extending from the first end toward the second end without reaching the second end; wherein the at least one first section further comprises at least one first section aperture 150C extending a length of about 15% to about 35% a distance between the first end and the second end, and extending a length of about 2% to about 100% a distance between the first side and the second side; and, (ii) at least one second section 200A comprising a mesh or a non-woven fabric having a first end and a second end, a first side and a second side, a first major surface and a second major surface, and a second section bulk between the first major surface and the second major surface, the second section bulk having a thickness extending from the second end toward the first end without reaching the first end; wherein the at least one second section further comprises at least one second section aperture 250C extending a length of about 40% to about 60% a distance between the second end and the first end, and extending a length of about 2% to about 100% a distance between the first side and the second side; and, (B) a second foldable layer 500B comprising (iii) at least one first section 100B comprising a mesh or a non-woven fabric having a first end and a second end, a first side and a second side, a first major surface and a second major surface, and a first section bulk between the first major surface and the second major surface, the first section bulk having a thickness extending from the second end to the first end; and, (iv) at least one second section 200B comprising a mesh or a non-woven fabric having a first end and a second end, a first side and a second side, a first major surface and a second major surface, and a second section bulk between the first major surface and the second major surface; the second section bulk having a thickness extending from the second end toward the first end without reaching the first end; wherein the at least one second section further comprises at least one second section aperture 250D extending a length of about 65% to about 85% a distance between the first end and the second end, and extending a length of about 2% to about 100% a distance between the first side and the second side; wherein the first foldable layer (A) is placed on top of the second foldable layer (B); and wherein, when the foldable element is folded, a part of the first section bulk thickness and/or a part of the second bulk thickness of the first foldable layer (A) fits in some of the at least one apertures of the at least one second section of the second foldable layer (B); and/or a part of the first section bulk thickness of the second foldable layer (B) fits in some of the at least one apertures of the at least one first section and/or the at least one apertures of the at least one second section of the first foldable layer (A); and, (b) the second support and drainage material comprising a second foldable element allowing fluid flow through, the second foldable element comprising (C) a first foldable layer 500A' comprising (i) at least one first section 100A' comprising a mesh or a non-woven fabric having a first end and a second end, a first side and a second side, a first major surface and a second major surface, and a first section bulk between the first major surface and the second major surface, the first section bulk having a thickness extending from the first end toward the second end without reaching the second end; wherein the at least one first section further comprises at least one first section aperture 150C' extending a length of about 15% to about 35% a distance between the first end and the second end, and extending a length of about 2% to about 100% a distance between the first side and the second side; and, (ii) at least one second section comprising a mesh or a non-woven fabric having a first end and a second end, a first side and a second side, a first major surface and a second major surface, and a second section bulk between the first major surface and the second major surface, the second section bulk having a thickness extending from the second end toward the first end without reaching the first end; wherein the at least one second section further comprises at least one second section aperture extending a length of about 40% to about 60% a distance between the second end and the first end, and extending a length of about 2% to about 100% a distance between the first side and the second side; and, (D) a second foldable layer 500B' comprising (iii) at least one first section 100B' comprising a mesh or a non-woven fabric having a first end and a second end, a first side and a second side, a first major surface and a second major surface, and a first section bulk between the first major surface and the second major surface, the first section bulk having a thickness extending from the second end to the first end; and, (iv) at least one second section 200B' comprising a mesh or a non-woven fabric having a first end and a second end, a first side and a second side, a first major surface and a second major surface, and a second section bulk between the first major surface and the second major surface; the second section bulk having a thickness extending from the second end toward the first end without reaching the first end; wherein the at least one second section further comprises at least one second section aperture 250D' extending a length of about 65% to about 85% a distance between the first end and the second end, and extending a length of about 2% to about 100% a distance between the first side and the second side; wherein the first foldable layer (C) is placed on top of the second foldable layer (D); and wherein, when the foldable element is folded, a part of the first section bulk thickness and/or a part of the second bulk thickness of the first foldable layer (C) fits in some of the at least one apertures of the at least one second section of the second foldable layer (D); and/or a part of the first section bulk thickness of the second foldable layer (D) fits in some of the at least one apertures of the at least one first section and/or the at least one apertures of the at least one second section of the first foldable layer (C).

FIG. 7 shows a side view of the support and drainage system 2500A comprising a filter system shown in FIGS. 6A-6D (with arrows showing the fluid flow), wherein the first and second support and drainage materials 1000A, 1000A' are fully folded. Using FIG. 7 for reference, wherein fluid can pass through support and drainage materials contacting two adjacent pleats, in accordance with an embodiment of filtering fluid, fluid passes through the first support and drainage material via one or more first sections 100A and one or more second sections 200A of the first foldable layer 500A, one or more first sections 100B and one or more second sections 200B of the second foldable layer 500B, through the upstream surface and downstream surface of the pleated filter 1500, and through the second support and drainage material via one or more first sections 100B' and one or more second sections 200B' of the second foldable layer 500B', one or more first sections 100A' and one or more second sections 200A' of the first foldable layer 500A'.

The support and drainage materials (meshes and fabrics) can be fabricated from any suitable material which is suitable for the fluid being filtered and for the applicable filtration parameters such as temperature.

The support and drainage materials can be produced by a variety of methods known in the art, including, for example, additive manufacturing (sometimes referred to as "additive layer manufacturing" or "3D printing").

In those embodiments comprising meshes wherein the meshes are polymeric, polymeric meshes come in the form of woven meshes and extruded meshes. Either type may be employed, but extruded meshes can be preferable because they are smoother and therefore produce less abrasion of adjoining layers of the filter media. An extruded mesh may have a first set of parallel strands and a second set of parallel strands intersecting the first set of strands at an angle. Extruded meshes may be classified as either symmetrical or non-symmetrical. In a symmetrical mesh, neither of the first or second sets of strands extends in the so-called "machine direction" of the mesh, which is the direction in which the mesh emerges from the mesh manufacturing machine. In a non-symmetrical mesh, one of the sets of strands extends parallel to the machine direction. Either symmetrical or non-symmetrical meshes can be used in accordance with embodiments of the invention.

A variety of meshes are suitable for use in accordance with embodiments of the invention. For example, suitable extruded polymeric meshes include those available from Schweiter-Mauduit International Inc. (Alpharetta, Ga.) under the trade name DELNET.

Meshes can be characterized by their thickness and by the number of strands per inch. These dimensions are not limited to any particular values and can be chose in accordance with the desired edgewise flow characteristics of the mesh and the desired strength. Typically, the mesh with have a mesh count of at least about 5 strands per inch.

In those embodiments comprising non-woven fabrics wherein the fabrics are polymeric, the non-woven fabric can be fabricated from any polymeric material, including polyester, polypropylene, or polyamide (e.g., nylon) which is suitable for the fluid being filtered and for the applicable filtration parameters such as temperature.

A variety of non-woven fabrics are suitable for use in accordance with embodiments of the invention. For example suitable non-woven fabrics include polyester spunbonded non-woven fabrics available from Avintiv Technical Non-wovens (Old Hickory, Tenn.) under the trade names REEMAY (e.g., REEMAY 2011 and REEMAY 2250 and TYPAR.

Typically, the mesh or non-wovens have a thickness in the range of from about 0.0005" to about 0.025" (more typically from about 0.005" to about 0.030"), and a void fraction of about 30% or more, but thicknesses can be greater or lesser than that range, and the void fraction can be less than that value. In those embodiments wherein the mesh or non-woven is folded and/or corrugated, the mesh or non-woven is sufficiently pliable to avoid damage to the mesh or non-woven and to the filter and filter element.

A porous filter and/or a porous filter element (e.g., a porous membrane and/or a porous fibrous medium) can have any suitable pore structure, e.g., a pore size (for example, as evidenced by bubble point, or by KL as described in, for example, U.S. Pat. No. 4,340,479, or evidenced by capillary condensation flow porometry), a pore rating, a pore diameter (e.g., when characterized using the modified OSU F2 test as described in, for example, U.S. Pat. No. 4,925,572), or removal rating that reduces or allows the passage therethrough of one or more materials of interest as the fluid is passed through the element. The pore structure used depends on the composition of the fluid to be treated, and the desired effluent level of the treated fluid.

The filter element can have any desired critical wetting surface tension (CWST, as defined in, for example, U.S. Pat. No. 4,925,572). The CWST can be selected as is known in the art, e.g., as additionally disclosed in, for example, U.S. Pat. Nos. 5,152,905, 5,443,743, 5,472,621, and 6,074,869. The surface characteristics of the element can be modified (e.g., to affect the CWST, to include a surface charge, e.g., a positive or negative charge, and/or to alter the polarity or hydrophilicity of the surface) by wet or dry oxidation, by coating or depositing a polymer on the surface, or by a grafting reaction.

The filter can include additional elements, layers, or components, that can have different structures and/or functions, e.g., prefiltration upstream of the filter media and/or cushioning (cushioning upstream of the filter media for damage protection or cushioning downstream of the filter media for damage protection and/or media support).

In accordance with embodiments of the invention, the filter and/or filter element can have a variety of configurations, including planar, pleated, and hollow cylindrical.

Exemplary filters and filter elements, including pleated filters, are disclosed in U.S. Pat. Nos. 5,543,047 and 5,552,048.

The filter, in some embodiments comprising a plurality of filter elements is typically disposed in a housing comprising at least one inlet and at least one outlet and defining at least one fluid flow path between the inlet and the outlet, wherein the filter is across the fluid flow path, to provide a filter device. Preferably, the filter device is sterilizable. Any housing of suitable shape and providing at least one inlet and at least one outlet may be employed.

The housing can be fabricated from any suitable rigid impervious material, including any impervious thermoplastic material, which is compatible with the fluid being processed. For example, the housing can be fabricated from a metal, such as stainless steel, or from a polymer.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A filter arrangement comprising:
a pleated porous filter having a plurality of pleats, and having an upstream surface and a downstream surface, the upstream surface having a first upstream end and a second upstream end, and the downstream surface having a first downstream end and a second downstream end; and
a support and drainage material of comprising
a foldable element allowing fluid flow through, the element comprising:
at least one first section comprising a mesh or a non-woven fabric having a first end and a second end, a first side and a second side, a first major surface and a second major surface, and a first section bulk between the first major surface and the second major surface, the first section bulk having a thickness extending from the first end to a portion of the second end; wherein the at least one first section further comprises at least one first section aperture extending a length of about 25% to about 75% a distance between the first end and the second end, and extending a length of about 2% to about 100% a distance between the first side and the second side; and
at least one second section comprising a mesh or a non-woven fabric having a first end and a second end, a first side and a second side, a first major surface and a second major surface, and a second section bulk between the first major surface and the second major surface, the second section bulk having a thickness extending from the first end to a portion of the second end; wherein the at least one second section further comprises at least one second section aperture extending a length of about 25% to about 75% a distance between the first end and the second end, and extending a length of about 2% to about 100% a distance between the first side and the second side;
wherein, when the foldable element is folded, a part of the first section bulk thickness fits in the at least one aperture of the at least one second section, and a part of the second section bulk thickness fits in the at least one aperture of the at least one first section,
arranged to contact the upstream surface of the pleated porous filter, or to contact the downstream surface of the pleated porous filter.

2. The filter arrangement of claim 1, wherein the support and drainage material further comprises an additional first section having an additional first section bulk thickness and at least one additional first section aperture and an additional second section having an additional second section bulk thickness and at least one additional second section aperture, wherein the additional first section is connected to the second section, and the additional second section is connected to the additional first section;
wherein, when the foldable element is folded, a part of the additional first section bulk thickness fits in the at least one aperture of the additional second section, and a part of the additional second section bulk thickness fits in the at least one aperture of the additional first section.

3. The filter arrangement of claim 1, wherein when the foldable element is folded, tapered flow channels, each having at least two steps, are provided.

4. The filter arrangement of claim 1, wherein the at least one first section has two or more first section apertures, each extending a length of about 25% to about 75% a distance between the first end and the second end; and
the at least one second section has two or more single second section apertures, each extending a length of about 25% to about 75% a distance between the first end and the second end.

5. A filter system comprising:
a pleated porous filter having a plurality of pleats, and having an upstream surface and a downstream surface, the upstream surface having a first upstream end and a second upstream end, and the downstream surface having a first downstream end and a second downstream end; and
a support and drainage material system comprising
a first support and drainage material allowing fluid flow through and a second separate support and drainage material allowing fluid flow through;
(a) the first support and drainage material comprising a first foldable element allowing fluid flow through, the first foldable element comprising:
at least one first section comprising a mesh or a non-woven fabric having a first end and a second end, a first side and a second side, a first major surface and a second major surface, and a first section bulk between the first major surface and the second major surface, the first section bulk having a thickness extending from the first end to a portion of the second end; wherein the at least one first section further comprises at least one first section aperture extending a length of about 25% to about 75% a distance between the first end and the second end, and extending a length of about 2% to about 100% a distance between the first side and the second side; and
at least one second section comprising a mesh or a non-woven fabric having a first end and a second end, a first side and a second side, a first major surface and a second major surface, and a second section bulk between the first major surface and the second major surface, the second section bulk having a thickness extending from the first end to a portion of the second end; wherein the at least one second section further comprises at least one second section aperture extending a length of about 25% to about 75% a distance between the first end and the second end, and extending a length of about 2% to about 100% a distance between the first side and the second side;

wherein, when the first foldable element is folded, a part of the first section bulk thickness fits in the at least one aperture of the at least one second section, and/or a part of the second section bulk thickness fits in the at least one aperture of the at least one first section; and, (b) the second support and drainage material comprising a second foldable element allowing fluid flow through, the second foldable element comprising:

at least one third section comprising a mesh or a non-woven fabric having a first end and a second end, a first side and a second side, a first major surface and a second major surface, and a third section bulk between the first major surface and the second major surface, the third section bulk having a thickness extending from the first end to a portion of the second en& wherein the at least one third section further comprises at least one third section aperture extending a length of about 25% to about 75% a distance between the first end and the second end, and extending a length of about 2% to about 100% a distance between the first side and the second side; and at least one fourth section comprising a mesh or a non-woven fabric having a first end and a second end, a first side and a second side, a first major surface and a second major surface, and a fourth section bulk between the first major surface and the second major surface, the fourth section bulk having a thickness extending from the first end to a portion of the second end; wherein the at least one fourth section further comprises at least one fourth section aperture extending a length of about 25% to about 75% a distance between the first end and the second end, and extending a length of about 2% to about 100% a distance between the first side and the second side;

wherein, when the second foldable element is folded, a part of the third section bulk thickness fits in the at least one aperture of the at least one fourth section, and a part of the fourth section bulk thickness fits in the at least one aperture of the at least one third section, wherein the pleated porous filter is arranged between the first support and drainage material and the second support and drainage material.

6. The filter system of claim 5, wherein the pleated porous filter comprises a laid-over-pleat filter.

7. The filter system of claim 5, further comprising an inner core and an outer cage.

8. A method of filtering fluid, the method comprising passing a fluid through the filter system of claim 5, including passing fluid through the first support and drainage material, the upstream surface of the pleated porous filter, the downstream surface of the pleated porous filter, and the second support and drainage material.

9. The filter system of claim 5, wherein when the first foldable element and the second foldable element are folded, tapered flow channels, each having at least two steps, are provided.

* * * * *